(12) United States Patent
Nimura et al.

(10) Patent No.: US 8,184,247 B2
(45) Date of Patent: May 22, 2012

(54) TN-MODE LIQUID CRYSTAL DISPLAY DEVICE, OPTICAL COMPENSATORY FILM FOR USE THEREIN AND METHOD FOR PRODUCING OPTICAL COMPENSATORY FILM, AND POLARIZING PLATE

(75) Inventors: Shigeaki Nimura, Minami-ashigara (JP); Michio Nagai, Minami-ashigara (JP); Hiroko Kamee, Minami-ashigara (JP); Hiroshi Satou, Minami-ashigara (JP); Makoto Ishihara, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 504 days.

(21) Appl. No.: 12/499,160

(22) Filed: Jul. 8, 2009

(65) Prior Publication Data

US 2010/0007828 A1    Jan. 14, 2010

(30) Foreign Application Priority Data

Jul. 8, 2008 (JP) ................................ 2008-178431
Sep. 30, 2008 (JP) ................................ 2008-253759
Mar. 30, 2009 (JP) ................................ 2009-081545

(51) Int. Cl.
*G02F 1/1335* (2006.01)

(52) U.S. Cl. ............................ 349/119; 349/96; 349/107

(58) Field of Classification Search .................. 349/117, 349/118, 119, 123, 106, 107, 96; 359/499; 156/60, 273.3
See application file for complete search history.

(56) References Cited

U.S. PATENT DOCUMENTS

| 7,084,944 B2 * | 8/2006 | Ito et al. ........................ 349/117 |
| 2007/0040963 A1 * | 2/2007 | Maruyama et al. ............ 349/96 |

FOREIGN PATENT DOCUMENTS

| JP | 8-50206 A | 2/1996 |
| JP | 2001-100031 A | 4/2001 |
| JP | 3156467 B2 | 4/2001 |
| JP | 2002-196146 A | 7/2002 |
| JP | 2008-020780 A | 1/2008 |
| JP | 2008-134587 A | 6/2008 |
| WO | 2004/068226 A1 | 8/2004 |

* cited by examiner

*Primary Examiner* — Thoi Duong
(74) *Attorney, Agent, or Firm* — Buchanan Ingersoll & Rooney PC

(57) ABSTRACT

An optical compensatory film of a laminated structure comprising a first optically anisotropic layer having an Re(550) of 20 to 100 nm wherein retardation at a wavelength of 550 nm is never 0 nm along any direction and the direction along which the absolute value of retardation at a wavelength of 550 nm reaches minimum does not exist along the normal direction of the layer or on the in-plane of the layer; and a second optically anisotropic layer having an Re(550) of 20 to 150 nm and an Rth(550) of 40 to 110 nm with Re(450) Re(550)<−3 nm and Rth(450)−Rth(550)>3 nm.

19 Claims, 2 Drawing Sheets

TN-MODE LIQUID CRYSTAL DISPLAY DEVICE, OPTICAL COMPENSATORY FILM FOR USE THEREIN AND METHOD FOR PRODUCING OPTICAL COMPENSATORY FILM, AND POLARIZING PLATE

BACKGROUND OF THE INVENTION

1. Field of the invention

The present invention relates to an optical compensatory film, a method for producing the same, and a polarizing plate. Additionally, the invention relates to a TN-mode liquid crystal display device with the optical compensatory film or the polarizing plate.

2. Description of the Related Art

Various optical compensatory films with optically anisotropic layers made from liquid crystal compositions as mounted on transparent supports have been proposed conventionally as optical compensatory films for use in TN-mode liquid crystal display devices.

For example, JP-A 8-50206 (Patent reference 1) proposes an optical compensatory film comprising a transparent support and an optically anisotropic layer mounted thereon, where the optically anisotropic layer is a layer comprising a compound with a discotic structure unit and having a negative birefringence, where the disc plane of the discotic structure unit tilts toward the plane of the transparent support and where the angle between the disc plane of the discotic structure unit and the plane of the transparent support varies along the depth direction of the optically anisotropic layer.

Additionally, JP-A 2002-196146 (Patent reference 2) proposes an optical compensatory film with the optically anisotropic layer on a transparent support having an in-plane retardation (Re) and a retardation along the thickness direction (Rth) within given ranges.

Further, JP-A 2001-100031 (Patent reference 3) proposes an optical compensatory film comprising a polymer film with optically positive uniaxiality or optical biaxiality, where the direction of the polymer film at the largest refractive index is substantially parallel to the polymer plane, and additionally comprising the optically anisotropic layer on the polymer film, where the direction of the polymer film at the largest refractive index is substantially parallel or perpendicular to the average direction of lines obtained by projecting the normal of the disc planes of the discotic liquid crystal molecules in the optically anisotropic layer toward the plane of the polymer film.

WO 2004/068226 (Patent reference 4) discloses a film with the increase in Re (Re inverse dispersion) and the decrease in Rth (Rth normal dispersion) following the increase of wavelength, as an optical compensatory film for use in VA-mode liquid crystal display devicees.

Meanwhile, Japanese Patent No. 3156467 (Patent reference 5), JP-A 2008-134587 (Parent reference 6) and JP-A 2008-20780 (Patent reference 7) describe liquid crystal display devicees, each comprising a pixel electrode and a liquid crystal cell in such a structure (multi-gap structure) that the interval between the liquid crystal layer and a counter electrode confronting the pixel electrode varies depending on the color of each color filter corresponding to the pixel electrode. For example, Japanese Patent No. 3156467 describes that the viewing angle of the TN-mode liquid crystal display device can be enlarged with a combination of a TN-mode liquid crystal cell of a multi-gap structure and an optically anisotropic layer satisfying the inequality formula nx>ny>nz. JP-A 2008-134587 describes the color shift of liquid crystal display devicees, particularly of OCB-mode liquid crystal display devicees, along the oblique direction thereof is improved via a combination of a liquid crystal cell of a multi-gap structure and an optical compensatory film including an optically anisotropic layer comprising a discotic compound together with a layer with the increase of Re and Rth (Re inverse dispersion, Rth inverse dispersion) following the increase of wavelength. JP-A 2008-20780 describes that the color tints of a liquid crystal display device can be improved via a combination of an optical compensatory film with the increase in Re (Re inverse dispersion) following the increase of wavelength with a liquid crystal cell of a multi-gap structure.

When such conventional optical compensatory films of constitutions as described above are practically used in TN-mode liquid crystal display devicees, however, the contrast decrease during the change of the viewing angle is large; and additionally when half tones are displayed and watched along the oblique lateral direction, the resulting image plane may sometimes be tinted yellowish. Since displayed images on television sets or TV function-equipped PC in particular are frequently watched by plural viewers at various positions, the display monitors for use in TV sets or TV function-equipped PC are not satisfactory even though the viewing angle performance thereof is satisfactory as the conventional PC display monitor.

In TN-mode liquid crystal display devicees, generally, two polarizing plates placing a cell between them are arranged while their transmission axes are perpendicular to each other. Compared with the observation case of the liquid crystal cell along the front direction, the transmission axes of the polarizing films (polarizers) observed along the oblique lateral direction are not perpendicular to each other. Therefore, light to be essentially absorbed in the polarizing plates transmits through the polarizing plates, so that the decrease of the contrast occurs when the viewing angle tilts along the oblique direction. Because no countermeasure against such phenomenon has been done so far, the contrast then has been insufficient. Due to the wavelength dispersibility of the liquid crystal in the liquid crystal cell, additionally, the optical rotation of the liquid crystal cell varies depending on the wavelength, so that yellowish tint emerges along the oblique lateral direction when half tones are displayed. No improvement of the emergence has been done so far, alike.

The present inventors made investigations. Consequently, it was revealed that the Re values of the films described in JP-A 8-50206 (Patent reference 1) and JP-A 2002-196146 (Patent reference 2), which correspond to the second optically anisotropic layer in accordance with the invention, were so small that the gap in the transmission axes of the polarizing plates could not be compensated, therefore resulting in the insufficient contrast along the oblique direction. As the films described in JP-A 2001-100031 (Patent reference 3), furthermore, two sheets of films with different optical profiles were used as the film corresponding to the second optically anisotropic layer in accordance with the invention; still further, one of the films had Re normal dispersion and Rth normal dispersion as wavelength dispersion and the other had Re inverse dispersion and Rth inverse dispersion. Hence, it was found that the color tints of half tones were not sufficiently improved.

Alternatively, WO 2004/068226 (Patent reference 4) never discloses a specific method for preparing a film with Re inverse dispersion and Rth normal dispersion, although the reference includes a description about the film. Thus, it was found that such film could never be prepared in a practical sense.

The inventors further made investigations on the liquid crystal display devicees using the liquid crystal cells of multi-gap structures, as described in Japanese Patent No. 3156467 (Patent reference 5), JP-A 2008-134587 (Patent reference 6) and JP-A 2008-20780 (Patent reference 7). Consequently, it was found that simple use of such liquid crystal cells of the multi-gap structures could insufficiently improve the viewing angle profile or could insufficiently reduce the change of the color tints.

SUMMARY OF THE INVENTION

In view of the problems of the background art as described above, it is an object of the invention to improve the viewing angle profile of a liquid crystal display device, particularly to provide a novel optical compensatory film and a novel polarizing plate, which can make contributions to the reduction of yellowish tint emerging along the oblique lateral direction during half tone display.

Furthermore, it is an object of the invention to provide a TN-mode liquid crystal display device with an improved viewing angle profile, in particular with the reduction of yellowish tint emerging along the oblique lateral direction during half tone display.

So as to overcome the problems described above, the inventors made investigations. Consequently, the inventors found that the inventions described in the patent references 1 through 7 were problematic in terms of insufficient control of wavelength dispersion represented by the Re and Rth of optical compensatory films themselves and in view of no lamination with optically anisotropic layers containing for example discotic compounds. Accordingly, the inventors achieved the compensation of light leakage along the oblique direction of polarizing plates and the reduction of the color tints of half tones by compensating the gap of transmission axes of polarizing plates via the setting of the optimal Re and Rth of the second optically anisotropic layer and compensating the half tones of the cell in a manner dependent on the wavelength via the optimization of wavelength dispersion. Thus, the inventors could propose the following invention.

[1] An optical compensatory film of a laminated structure comprising:

a first optically anisotropic layer having an Re(550) of 20 to 100 nm wherein retardation at a wavelength of 550 nm is never 0 nm along any direction and the direction along which the absolute value of retardation at a wavelength of 550 nm reaches minimum does not exist along the normal direction of the layer or on the in-plane of the layer; and a second optically anisotropic layer having an Re(550) of 20 to 150 nm and an Rth(550) of 40 to 110 nm with the following inequality formulae (a) and (b) being satisfied:

$$Re(450)-Re(550)<-3 \text{ nm} \tag{a}$$

$$Rth(450)-Rth(550)>3 \text{ nm} \tag{b}$$

wherein Re(450) represents an in-plane retardation at a wavelength of 450 nm; Re(550) represents an in-plane retardation at a wavelength of 550 nm; Rth(450) represents a retardation along the thickness direction at a wavelength of 450 nm; and Rth(550) represents a retardation along the thickness direction at a wavelength of 550 nm.

[2] The optical compensatory film according to [1], wherein the first optically anisotropic layer comprises a liquid crystal compound.

[3] The optical compensatory film according to [1], wherein the first optically anisotropic layer comprises a discotic liquid crystal compound.

[4] The optical compensatory film according to [3], wherein the discotic liquid crystal compound is fixed at a hybrid aligned state in the first optically anisotropic layer.

[5] The optical compensatory film according to any one of [1] to [4], wherein the second optically anisotropic layer comprises a compound having a negative intrinsic birefringence and a compound having an absorption peak within the range of 250 to 400 nm.

[6] The optical compensatory film according to [5], wherein the second optically anisotropic layer comprises the compound having an absorption peak within the range of 250 to 400 nm in an amount of 2 to 20% by mass relative to 100% by mass of the compound having a negative intrinsic birefringence.

[7] The optical compensatory film according to any one of [1] to [6], wherein the second optically anisotropic layer comprises a compound having a negative intrinsic birefringence and a compound having an absorption peak within the range of 700 to 1200 nm.

[8] The optical compensatory film according to [7], wherein the second optically anisotropic layer comprises the compound having an absorption peak within the range of 700 to 1200 nm in an amount of 0.001 to 2% by mass relative to 100% by mass of the compound having a negative intrinsic birefringence.

[9] The optical compensatory film according to any one of [5] to [8], wherein the compound having a negative intrinsic birefringence is a cellulose acylate having a total substitution degree of 2.7 to 3.0.

[10] The optical compensatory film according to any one of [1] to [9], wherein the second optically anisotropic layer satisfies the following inequality formulae (c) and (d):

$$Re(550)-Re(650)<-3 \text{ nm} \tag{c}$$

$$Rth(550)-Rth(650)>3 \text{ nm} \tag{d}$$

wherein Re(550) represents an in-plane retardation at a wavelength of 550 nm; Re(650) represents an in-plane retardation at a wavelength of 650 nm; Rth(550) represents a retardation along the thickness direction at a wavelength of 550 nm; and Rth(650) represents a retardation along the thickness direction at a wavelength of 650 nm.

[11] The optical compensatory film according to any one of [1] to [10], comprising an alignment layer between the first optically anisotropic layer and the second optically anisotropic layer.

[12] A method for producing an optical compensatory film of a laminated structure comprising a first optically anisotropic layer and a second optically anisotropic layer, comprising laminating:

a first optically anisotropic layer having an Re(550) of 20 to 100 nm wherein retardation at a wavelength of 550 nm is never 0 nm along any direction and the direction along which the absolute value of retardation at a wavelength of 550 nm reaches minimum does not exist along the normal direction of the layer or on the in-plane of the layer; and a second optically anisotropic layer having an Re(550) of 20 to 150 nm and an Rth(550) of 40 to 110 nm with the following inequality formulae (a) and (b) being satisfied:

$$Re(450)-Re(550)<-3 \text{ nm} \tag{a}$$

$$Rth(450)-Rth(550)>3 \text{ nm} \tag{b}$$

wherein Re(450) represents an in-plane retardation at a wavelength of 450 nm; Re(550) represents an in-plane retardation at a wavelength of 550 nm; Rth(450) represents a retardation along the thickness direction at a wavelength of 450 nm; and Rth(550) represents a retardation along the thickness direction at a wavelength of 550 nm.

[13] The method for producing an optical compensatory film according to [12], comprising:

producing a preliminary film for the second optically anisotropic layer; and drawing the preliminary film along the transfer direction of the preliminary film during the transfer thereof to form the second optically anisotropic layer.

[14] The method for producing an optical compensatory film according to [12] or [13], comprising:

producing a preliminary film for the second optically anisotropic layer; and subjecting the preliminary film to a heat treatment at a temperature of $T_{g0}$ to $T_{m0}$ to form the second optically anisotropic layer wherein $T_{g0}$ represents the glass transition temperature of the preliminary film before the heat treatment and $T_{m0}$ represents the melting point of the preliminary film before the heat treatment.

[15] The method for producing an optical compensatory film according to any one of [12] to [14], comprising producing the second optically anisotropic layer by using a composition containing a compound having a negative intrinsic birefringence and a compound having a absorption peak of 250 to 400 nm.

[16] The method for producing an optical compensatory film according to any one of [12] to [15], comprising producing the second optically anisotropic layer by using a composition containing a compound having a negative intrinsic birefringence and a compound having an absorption peak of 700 to 1200 nm.

[17] A polarizing plate comprising an optical compensatory film of any one of [1] to [11] and a polarizing film, wherein the cross angle between the in-plane slow axis of the optical compensatory film and the in-plane transmission axis of the polarizing film is approximately zero.

[18] A TN-mode liquid crystal display device comprising an optical compensatory film of any one of [1] to [11] wherein the optical compensatory film has a laminated structure comprising a first optically anisotropic layer and a second optically anisotropic layer.

[19] The TN-mode liquid crystal display device according to [18], equipped with a liquid crystal cell and a polarizing plate mounted on at least one side of the liquid crystal cell, wherein:

the liquid crystal cell comprises red, green and blue color filters and liquid crystal layers individually corresponding to the red, green and blue color filters, the liquid crystal layers have multi-gap structures satisfying the relation represented by the following inequality formula:

$$dR \geq dG > dB, \text{ or}$$

$$dR > dG \geq dB$$

wherein dR, dG and dB each represent the thickness values of the liquid crystal layers corresponding to the red, green and blue color filters, respectively, and the polarizing plate comprises a polarizing film and the optically compensation film as mounted on the liquid crystal cell side of the polarizing film.

[20] The TN-mode liquid crystal display device according to [19], wherein the multi-gap structures of the liquid crystal layers satisfy the following inequality formula:

$$0 \text{ } \mu m < dR - dB \leq 3.0 \text{ } \mu m$$

In accordance with the invention, a novel optical compensatory film and a novel polarizing plate are provided, which can make contributions to the improvement of the viewing angle profile of a liquid Crystal display device, particularly to the reduction of yellowish tint emerging along the oblique lateral direction during half tone display.

In accordance with the invention, a TN-mode liquid crystal display device with the improvement of the viewing angle profile thereof, in particular with the reduction of the yellowish tint emerging along the oblique lateral direction during half tone display.

Additionally, the optical compensatory film, the polarizing plate and the TN-mode liquid crystal display device in accordance with the invention can advantageously compensate the contrast of the liquid crystal display device as affected by light at a wavelength around 550 nm.

BRIEF DESCRIPTION OF THE DRAWINGS

In FIGS. 1-3, 10 is optical compensatory film, 11 is first optically anisotropic layer, 12 is second optically anisotropic layer, 13 is polarizing film, 14 is protective film, 15 is polarizing plate, 16 is liquid crystal cell, and 17 is TN-mode liquid crystal display device.

BEST MODE FOR CARRYING OUT THE INVENTION

The optical compensatory film and the method for producing it, the polarizing plate and the TN-mode liquid crystal display device of the invention are described in detail hereinunder. The description of the constitutive elements of the invention given hereinunder may be for some typical embodiments of the invention, to which, however, the invention should not be limited. In this application, the numerical range expressed by the wording "a number to another number" means the range that falls between the former number indicating the lowermost limit of the range and the latter number indicating the uppermost limit thereof.

[Optical Compensatory Film]

(1) Constitution of the Layers of the Optical Compensatory Film

The optical compensatory film of the invention is of a structure in lamination comprising at least a first optically anisotropic layer and a second optically anisotropic layer.

Figure 1:
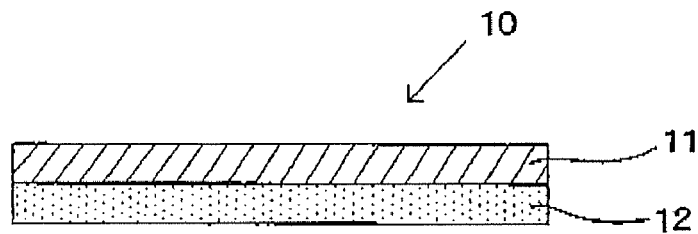
FIG. 1 is a schematic cross sectional view of one embodiment of the optical compensatory film of the invention.
Figure 2:
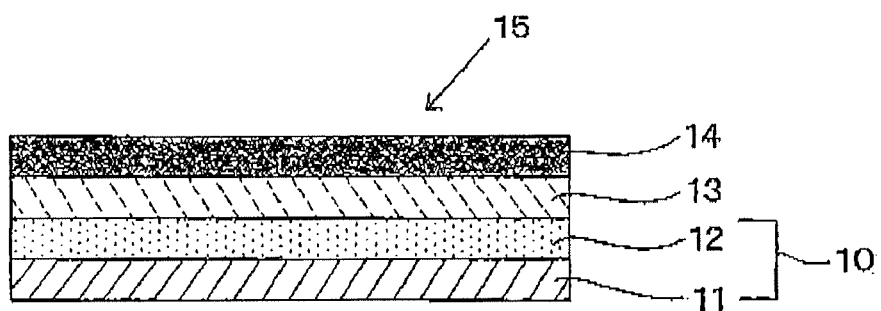
FIG. 2 is a schematic cross sectional view of one embodiment of the polarizing plate of the invention.
Figure 3:
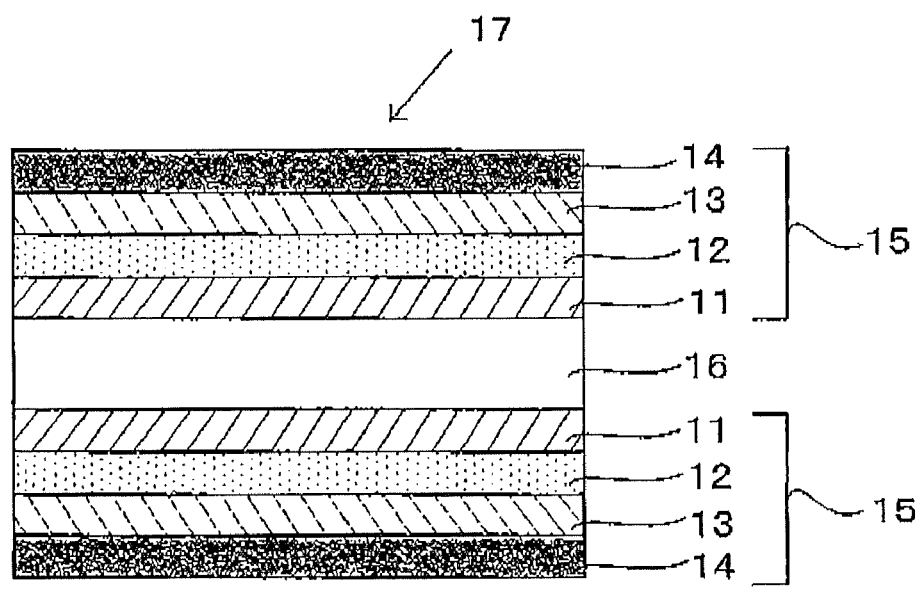
FIG. 3 is a schematic cross sectional view of one embodiment of the liquid crystal display device of the invention.

FIG. 1 depicts a schematic cross sectional view of one embodiment of the optical compensatory film of the invention. The optical compensatory film 10 shown in FIG. 1 comprises a first optically anisotropic layer 11 preferably made from a liquid crystal composition and a second optically anisotropic layer 12 as a polymer film supporting the first optically anisotropic layer 11. An alignment layer regulating the alignment of liquid crystal molecules may be arranged between the optically anisotropic layers 11 and 12 in forming the optically anisotropic layer 11 from a liquid crystal composition. Herein, FIG. 1 is a simple schematic view, where the relative thickness of each of the layers never essentially reflects the relative thickness of each of the layers in the actual optical compensatory film. The same is true with FIGS. 2 and 3 shown below.

Various materials for possible use in preparing the second optically anisotropic layer and the first optically anisotropic layer composing the optical compensatory film of the invention as well as methods for preparing the same are mainly described below.

(2) Second Optically Anisotropic Layer (2-1) Characteristic Features of the Second Optically Anisotropic Layer The second optically anisotropic layer composing the optical compensatory film of the invention characteristically satisfies all the four inequality formulae below.

$20\ \text{nm} \leq Re(550) \leq 150\ \text{nm}$ $40\ \text{nm} \leq Rth(550) \leq 110\ \text{nm}$ $Re(450) - Re(550) < -3\ \text{nm}$ \hfill (a)

$Rth(450) - Rth(550) > 3\ \text{nm}$ \hfill (b)

Herein, the inequality formula (a) defines that the relation between Re at a 450-nm wavelength and Re at a 550-nm wavelength of the optical compensatory film is in inverse dispersion, while the inequality formula (b) defines that the relation between Rth at a 450-nm wavelength and Rth at a 550-nm wavelength of the optical compensatory film is in normal dispersion.

When Re(550) of the second optically anisotropic layer is 20 nm or more or is 150 nm or less, preferably, the liquid crystallinity of the cell can be sufficiently compensated to improve the contrast viewing angle and the color tint. When Rth(550) of the second optically anisotropic layer is 40 nm or more or is 110 nm or less, preferably, the compensation of the polarizing plate along the oblique direction is so satisfactory that the contrast viewing angle and the color tint can be improved. When the value according to the inequality formula [Re(450)–Re(550)] is less than –3 nm or when the value according to the inequality formula [Rth(450)–Rth(550)] is more than 3 nm, preferably, the contrast viewing angle can be improved.

The second optically anisotropic layer composing the optical compensatory film of the invention preferably satisfies the inequality formulae below.

$40\ \text{nm} \leq Re(550) \leq 120\ \text{nm}$ $40\ \text{nm} \leq Rth(550) \leq 90\ \text{nm}$ $-40\ \text{nm} < Re(450) - Re(550) < -5\ \text{nm}$ $5\ \text{nm} < Rth(450) - Rth(550) < 30\ \text{nm}$ More preferably, the second optically anisotropic layer satisfies the inequality formulae below.

$50\ \text{nm} \leq Re(550) \leq 100\ \text{nm}$ $50\ \text{nm} \leq Rth(550) \leq 80\ \text{nm}$ $-35\ \text{nm} < Re(450) - Re(550) < -10\ \text{nm}$ $10\ \text{nm} < Rth(450) - Rth(550) < 25\ \text{nm}$ From the viewpoints of the contrast viewing angle and the color tint, the second optically anisotropic layer particularly preferably satisfies the following inequality formulae (c) and (d). Herein, Re(650) represents the in-plane retardation at a wavelength of 650 nm; and Rth(650) represents the retardation along the thickness direction at a wavelength of 650 nm.

$Re(550) - Re(650) < -3\ \text{nm}$ \hfill (c)

$Rth(550) - Rth(650) > 3\ \text{nm}$ \hfill (d)

Herein, the formula (c) defines that the relation between Re at a 550-nm wavelength and Re at a 650-nm wavelength of the optical compensatory film is in inverse dispersion, while the formula (d) defines that the relation between Rth at a 550-nm wavelength and Rth at a 650-nm wavelength of the optical compensatory film is in normal dispersion.

The characteristic feature of the second optically anisotropic layer composing the optical compensatory film of the invention is particularly preferably represented by the following inequality formulae.

$-40\ \text{nm} < Re(550) - Re(650) < -5\ \text{nm}$ $5\ \text{nm} < Rth(550) - Rth(650) < 30\ \text{nm}$ The characteristic feature thereof is more particularly preferably represented by the following inequality formulae.

$-35\ \text{nm} < Re(550) - Re(650) < -10\ \text{nm}$ $10\ \text{nm} < Rth(550) - Rth(650) < 25\ \text{nm}$ The film for use as the second optically anisotropic layer in accordance with the invention is preferably a photo-transmissible polymer film. Specifically, a polymer film at an 80% or more transmission rate of light in the visible light region is preferable; a polymer film at a 90% or more transmission rate thereof is more preferable and a polymer film at a 95% or more transmission rate thereof is still more preferable. When the second optically anisotropic layer is such polymer film, the optical compensatory film of the invention and the polarizing film can readily be attached together. Additionally, the polymer film can be integrated as a single member (for example as an optical compensatory film) in a liquid crystal display device. As the material of the polymer film, a polymer with excellent optical properties, transparency, mechanical strength, thermal stability and water shield ability is preferable. Any material capable of forming a film satisfying the optical properties described above as required for the second optically anisotropic layer may be used. For example, a cellulose-series polymer with acetyl group on a side chain thereof (referred to as cellulose acylate hereinbelow) is prepared into a film by a solution filming method or melt filming method, which is then subjected to a drawing process if desired, so that the resulting film can satisfy the optical properties required for the second optically anisotropic layer. Additives capable of inducing the exertion of such Re and/or Rth may be added to the polymer film, to prepare a polymer film satisfying the optical properties described above. The method for preparing a film for use as the second optically anisotropic layer is described in detail below.

Cellulose acylate for preferable use as a material of the cellulose acylate film for use as the second optically anisotropic layer may be cellulose acylate with acetyl group alone as the acyl substituent in the cellulose acylate or may be a composition comprising cellulose acylate with plural acyl substituents. The total substitution degree of the cellulose acylate is preferably 2.7 to 3.0 so as to give a negative intrinsic birefringence. The term "negative intrinsic birefringence" means the property such that the maximum refractive index is along a direction perpendicular to the drawing direction of the polymer film in drawing the polymer film. In accordance with the invention, an optically anisotropic layer with required negative intrinsic birefringence is obtained, preferably, by using a polymer with the acyl substitution degree described above and then passing the resulting polymer through the drawing or heat treatment step described below.

The thickness of the second optically anisotropic layer is never limited specifically but is preferably 30 to 200 μm, more preferably 30 to 100 μm, still more preferably 40 to 90 μm.

(2-2) Materials to be used in the Film for use as the Second Optically Anisotropic Layer (2-2-1) Polymer First, a polymer for possible use in the film for use as the second optically anisotropic layer is described. The polymer is preferably a polymer with a negative intrinsic birefringence.

Examples of the polymers used to a film for the second optical anisotropic layer preferably include cellulose esters (e.g., cellulose triacetate, cellulose acetate propionate, cellulose acetate butyrate, cellulose tripropionate, cellulose diacetate) and cellulose triacetate is more preferable among them.

The polymer may be powdery or granular, or may also be in the form of pellets.

Preferably, the water content of the polymer is at most 1.0% by mass, more preferably at most 0.7% by mass, most preferably at most 0.5% by mass. As the case may be, the water content is preferably at most 0.2% by mass. In the case where the water content of the polymer oversteps the preferred range, then it is desirable to use the polymer after dried by heating.

One or more these polymers may be used herein either singly or as combined.

The cellulose ester includes cellulose ester compounds, and ester-substituted cellulose skeleton-having compounds that are produced by biologically or chemically introducing a functional group to a starting cellulose material. Of those, especially preferred is cellulose acylate.

The essential polymer ingredient of the transparent polymer film of the invention is preferably the above-mentioned cellulose acylate. The "essential polymer ingredient" as referred to herein is, when the film is formed of a single polymer, that single polymer; but when the film is formed of plural polymers, then the polymer having a highest mass fraction of those constitutive polymers is the "essential polymer ingredient".

The cellulose ester is an ester of cellulose and acid. The acid that constitutes the ester is preferably an organic acid, more preferably a carboxylic acid, even more preferably a fatty acid having from 2 to 22 carbon atoms, most preferably a lower fatty acid having from 2 to 4 carbon atoms.

The cellulose acylate is an ester of cellulose and carboxylic acid. In the cellulose acylate, all or a part of the hydrogen atoms of the hydroxyl groups existing at the 2-, 3- and 6-positions of the glucose unit that constitutes cellulose are substituted with an acyl group. Examples of the acyl group are an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, a cinnamoyl group. The acyl group is preferably an acetyl group, a propionyl group, a butyryl group, a dodecanoyl group, an octadecanoyl group, a pivaloyl group, an oleoyl group, a benzoyl group, a naphthylcarbonyl group, a cinnamoyl group, most preferably an acetyl group, a propionyl group, a butyryl group.

The cellulose ester may be an ester of cellulose with plural acids. The cellulose acylate may be substituted with plural acyl groups.

The degree of substitution of the hydroxyl group of cellulose with an acetyl group (having 2 carbon atoms) in cellulose acylate is represented by SA; and the degree of substitution of the hydroxyl group of cellulose with an acyl group having at least 3 carbon atoms is by SB. By controlling SA and SB, the Re expressibility and the humidity dependence of retardation of the produced cellulose ester film may be controlled. The humidity dependence of retardation means the humidity-dependent retardation change of the film.

With regard to the total substitution degree expressed as SA+SB, the cellulose ester used in the invention satisfies preferably $2.70 < SA+SB \leq 3.00$, more preferably $2.88 \leq SA+SB \leq 3.00$, even more preferably $2.89 \leq SA+SB \leq 2.99$, still more preferably $2.90 \leq SA+SB \leq 2.98$, further more preferably $2.92 \leq SA+SB \leq 2.97$. Increasing (SA+SB) results in the increase in Re of the heat-treated film, therefore reducing the humidity dependence of retardation. In the case where the hydroxyl groups in cellulose are all substituted, the above-mentioned degree of substitution is 3.

By controlling SB, the humidity dependence of retardation of the cellulose ester film may be controlled. Increasing SB results in the reduction in the humidity dependence of retardation, and the melting point of the film is thereby lowered. In consideration of the balance between The humidity dependence of retardation and the melting point depression, the SB range is preferably $0 < SB \leq 3.0$, more preferably $0 < SB \leq 1.0$, even more preferably $0.1 \leq SB \leq 0.7$.

Cellulose ester may be produced in known methods.

For example, the basic principle of a method of production of cellulose acylate is described in Nobuhiko Migita, et al., Wood Chemistry, pp. 180-190 (Kyoritsu Publishing, 1968). One typical production method for cellulose acylate is a liquid-phase acetylation method with a carboxylic acid anhydride-carboxylic acid-sulfuric acid catalyst. Concretely, a cellulose material such as cotton linter or wood pulp is pretreated with a suitable amount of a carboxylic acid such as acetic acid, then esterified by putting it into a previously-cooled acylation mixture liquid to thereby produce a complete cellulose acylate (the total of the degree of acylation at the 2-, 3- and 6-position thereof is almost 3.00). The acylation mixture liquid generally contains a carboxylic acid serving as a solvent, a carboxylic acid anhydride serving as an esterifying agent and sulfuric acid serving as a catalyst. In general, the amount of the carboxylic acid anhydride is a stoichiometrically excessive amount over the total amount of the cellulose to be reacted with it and water existing in the system.

After the acylation, the excessive carboxylic acid anhydride still remaining in the system is hydrolyzed, for which water or water-containing acetic acid is added thereto. Then, a part of the esterification catalyst is neutralized, for which an aqueous solution of a neutralizing agent (e.g., calcium, magnesium, iron, aluminium or zinc carbonate, acetate, hydroxide or oxide) may be added to the system. Next, the obtained complete cellulose acylate is kept at 20 to 90° C. in the presence of a small amount of an acylation catalyst (generally, this is the remaining sulfuric acid) to thereby saponify and ripen it into a cellulose acylate having a desired degree of acyl substitution and a desired degree of polymerization. When the desired cellulose acylate is obtained, the catalyst still remaining in the system is completely neutralized with the above-mentioned neutralizing agent, or not neutralized, the cellulose acylate solution is put into water or diluted sulfuric acid (or water or diluted sulfuric acid is put into the cellulose acylate solution) to thereby separate the cellulose acylate, which is then washed and stabilized to be the intended cellulose acylate.

The degree of polymerization of the cellulose acylate is preferably from 150 to 500 in terms of the viscosity-average degree of polymerization thereof, more preferably from 200 to 400, even more preferably from 220 to 350. The viscosity-average degree of polymerization may be measured according to an Uda et al's limiting viscosity method (Kazuo Uda, Hideo Saito; the Journal of the Society of Fiber Science and Technology of Japan, Vol. 18, No, 1, pp. 105-120, 1962). The method for measuring the viscosity-average degree of polymerization is described also in JP-A 9-95538.

Cellulose acylate having a small amount of a low-molecular component may have a high mean molecular weight (degree of polymerization), but its viscosity is generally lower than ordinary cellulose acylate. Cellulose acylate having a small amount of a low-molecular component may be obtained by removing the low-molecular component from cellulose acylate produced in an ordinary manner. The removal of the low-molecular component may be attained by washing cellulose acylate with a suitable organic solvent. Further, cellulose acylate having a small amount of a low-molecular component may also be obtained by synthesis. When cellulose acylate having a small amount of a low-molecular component therein is produced, it is desirable that the amount of the sulfuric acid catalyst for use in acylation is controlled to be from 0.5 to 25 parts by mass relative to 100 parts by mass of cellulose. When the amount of the sulfuric acid catalyst is within the above range, then cellulose acylate may be produced which is favorable in point of the molecular weight distribution thereof (having a uniform molecular weight distribution). The degree of polymerization of cellulose acylate and the molecular weight distribution thereof may be determined through gel permeation chromatography (GPC) or the like.

The starting cotton for cellulose ester and the method for producing it are described also in Hatsumei Kyokai Disclosure Bulletin (No. 2001-1745, published by the Hatsumei Kyokai on Mar. 15, 2001), pp. 7-12.

(2-2-2) Adjuster of Wavelength Dispersion

So as to produce a film satisfying the conditions of the wavelength dispersion for use as the second optically anisotropic layer in accordance with the invention, an adjuster of wavelength dispersion is preferably used. The term "adjuster of wavelength dispersion" in accordance with the invention means a compound with the absorption peak in a wavelength region of 250 to 400 nm, or a compound with the absorption peak in a wavelength region of 700 to 1200 nm. The compound with the absorption peak in the wavelength region of 250 to 400 nm may also be referred to as "short wavelength-adjuster of wavelength dispersion", while the compound with the absorption peak in the wavelength region of 700 to 1200 nm may also be referred to as "long wavelength-adjuster of wavelength dispersion".

The short wavelength-adjuster of wavelength dispersion is a compound with the absorption peak in the wavelength region of 250 to 400 nm, preferably 300 to 380 nm, more preferably 330 to 370 nm. The long wavelength-adjuster of wavelength dispersion is a compound with the absorption peak in the wavelength region of 700 to 1200 nm, preferably 700 to 900 nm, more preferably 750 to 800 nm. By drawing a film prepared by adding such adjuster of wavelength dispersion to a polymer with a negative birefringence, the film for use as the second optically anisotropic layer can readily be produced, which satisfies the conditions of the wavelength dispersion in accordance with the invention. Specifically, the short wavelength-adjuster of wavelength dispersion is preferably contained in the second optically anisotropic layer, so as to adjust the values of the inequality formulae [Re(450)–Re(550)] and [Rth(450)–Rth(550)] to the preferable ranges described above. Furthermore, the long wavelength-adjuster of wavelength dispersion is preferably contained in the second optically anisotropic layer, so as to adjust the values of the inequality formulae [Re(550)–Re(650)] and [Rth(550)–Rth(650)] to the preferable ranges described above. The short wavelength-adjuster of wavelength dispersion may satisfactorily be a compound absorbing light in wavelength regions other than the wavelength region of 250 to 400 nm, as long as the compound has the absorption peak at 250 to 400 nm; and the long wavelength-adjuster of wavelength dispersion may be a compound absorbing light in wavelength regions other than the wavelength region of 700 to 1200 nm, as long as the compound has the absorption peak at 700 to 1200 nm, as well.

The adjuster of wavelength dispersion for use in accordance with the invention is preferably a compound substantially without any evaporation in all the processes for producing the optical compensatory film and a liquid crystal display device. Only one adjuster of wavelength dispersion may be used or two or more of such adjusters of wavelength dispersion may be used in combination. The total amount of the adjusters of wavelength dispersion varies depending on the optical properties and the like to be given to the film, but is preferably 2 to 20% by mass, more preferably 4 to 15% by mass, still more preferably 5 to 10% by mass of cellulose acylate. Preferably, the adjusters of wavelength dispersion are preliminarily added to and mixed with a melt or a solution for film production, prior to the film production.

The short wavelength-adjuster of wavelength dispersion for use in accordance with the invention is preferably a compound represented by any of the following formulae (I) through (VII). Among compounds represented by the formulae (I) through (VII), compounds represented by the formulae (I) through (III) are more preferable. Compounds represented by the formula (I) are still more preferable. Additionally, compounds represented by the following formula (VII) are also preferable and include for example a commercially available product TINOPAL OB (under the product name; manufactured by Ciba Specialty Chemicals Corporation).

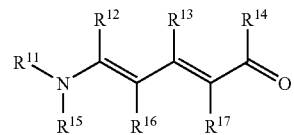

Formula (I)

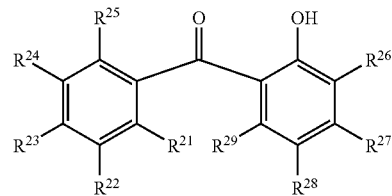

Formula (II)

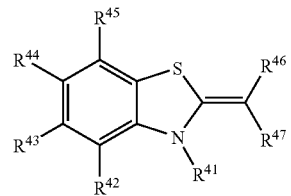

Formula (III)

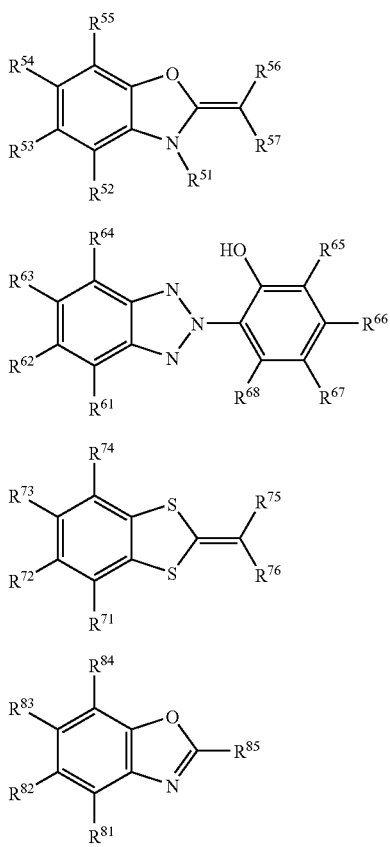

Formula (IV)

Formula (V)

Formula (VI)

Formula (VII)

$R^{11}$, $R^{12}$, $R^{13}$, $R^{14}$, $R^{15}$, $R^{16}$ and $R^{17}$ in the formula (I) $R^{21}$, $R^{22}$, $R^{23}$, $R^{24}$, $R^{25}$, $R^{26}$, $R^{27}$, $R^{28}$ and $R^{29}$ in the formula (II), $R^{41}$, $R^{42}$, $R^{43}$, $R^{44}$, $R^{45}$, $R^{46}$ and $R^{47}$ in the formula (III), $R^{51}$, $R^{52}$, $R^{53}$, $R^{54}$, $R^{55}$, $R^{56}$ and $R^{57}$ in the formula (IV), $R^{61}$, $R^{62}$, $R^{63}$, $R^{64}$, $R^{65}$, $R^{66}$, $R^{67}$ and $R^{68}$ in the formula (V) $R^{71}$, $R^{72}$, $R^{73}$, $R^{74}$, $R^{75}$, and $R^{76}$ in the formula (VI), and $R^{81}$, $R^{82}$, $R^{83}$, $R^{84}$, and $R^{85}$ in the formula (VII) independently represent hydrogen atom or a substituent.

In the formulae (I) through (VII), the substituents are preferably in combination so that the horizontal direction (left/right direction) of the paper plane may be the longitudinal direction of the molecules.

Examples of the substituent include a halogen atom (e.g., fluorine atom, chlorine atom, bromine atom, iodine atom), an alkyl group (preferably an alkyl group having 1 to 30 carbon atoms such as a methyl group, ethyl group, n-propyl group, isopropyl group, tert-butyl group, n-octyl group, 2-ethylhexyl group), a cycloalkyl group (preferably a substituted or unsubstituted cycloalkyl group having 3 to 30 carbon atoms such as a cyclohexyl group, cyclopentyl group, 4-n-dodecylcyclohexyl group), a bicycloalkyl group (preferably a substituted or unsubstituted bicycloalkyl group having 5 to 30 carbon atoms, that is, a monovalent group that is formed by removing one hydrogen atom from bicycloalkane having 5 to 30 carbon atoms; such as a bicyclo[1.2.2]heptane-2-yl group, bicyclo [2.2.2]octane-3-yl group), an alkenyl group (preferably a substituted or unsubstituted alkenyl group having 2 to 30 carbon atoms such as a vinyl group, allyl group), a cycloalkenyl group (preferably a substituted or unsubstituted cycloalkenyl group having 3 to 30 carbon atoms, that is, a monovalent group that is formed by removing one hydrogen atom from cycloalkane having 3 to 30 carbon atoms; such as a 2-cyclopentene-1-yl group, 2-cyclohexene-1-yl group), a bicycloalkenyl group (a substituted or unsubstituted bicycloalkenyl group, preferably a substituted or unsubstituted bicycloalkenyl group having 5 to 30 carbon atoms, that is, a monovalent group that is formed by removing one hydrogen atom from a bicycloalkene having one double bond; such as a bicyclo [2.2.1]pepto-2-ene-1-yl group, bicyclo [2.2.2]octo-2-ene-4-yl group), an alkynyl group (preferably a substituted or unsubstituted alkynyl group having 2 to 30 carbon atoms such as an ethynyl group, propargyl group), an aryl group (preferably a substituted or unsubstituted aryl group having 6 to 30 carbon atoms such as a phenyl group, p-tolyl group, naphthyl group), a heterocyclic group (preferably a monovalent group that is formed by removing one hydrogen atom from a 5-membered or 6-membered substituted or unsubstituted aromatic or nonaromatic heterocyclic compound or a combination thereof (including a condensed ring), further preferably a monovalent group that is formed by removing one hydrogen atom from a 5-membered or 6-membered heterocyclic compound having 3 to 30 carbon atoms or a combination thereof (including a condensed ring); such as a 2-furyl group, 2-thienyl group, 2-pyrimidinyl group, 2-benzothiazolyl group), a cyano group, a hydroxyl group, a nitro group, a carboxyl group, an alkoxy group (preferably a substituted Or unsubstituted alkoxy group having 1 to 30 carbon atoms such as a methoxy group, ethoxy group, isopropoxy group, tert-butoxy group, n-octyloxy group, 2-methoxyethoxy group), an aryloxy group (preferably a substituted or unsubstituted aryloxy group having 6 to 30 carbon atoms such as a phenoxy group, 2-methylphenoxy group, 4-tert-butylphenoxy group, 3-nitrophenoxy group, 2-tetradecanoylaminophenoxy group), a silyloxy group (preferably a silyloxy group having 3 to 20 carbon atoms such as a trimethylsilyloxy group, tert-butyidimethylsilyloxy group), a heterocyclicoxy group (preferably a substituted or unsubstituted heterocyclicoxy group having 2 to 30 carbon atoms, 1-phenyltetrazole-5-oxy group, 2-tetrahydropyranyloxy group), an acyloxy group (preferably a formyloxy group, substituted or unsubstituted alkylcarbonyloxy group having 2 to 30 carbon atoms, substituted or unsubstituted arylcarbonyloxy group having 6 to 30 carbon atoms such as a formyloxy group, acetyloxy group, pivaloyloxy group, stearoyloxy group, benzoyloxy group, p-methoxyphenylcarbonyloxy group), a carbamoyloxy group (preferably a substituted or unsubstituted carbamoyloxy group having 1 to 30 carbon atoms such as a N,N-dimethylcarbamoyloxy group, N,N-diethylcarbamoyloxy group, morpholinocarbonyloxy group, N,N-di-n-octylaminocarbonyloxy group, N-n-octylcarbamoyloxy group), an alkoxycarbonyloxy group (preferably a substituted or unsubstituted alkoxycarbonyloxy group having 2 to 30 carbon atoms such as a methoxycarbonyloxy group, ethoxycarbonyloxy group, tert-butoxycarbonyloxy group, n-octylcarbonyloxy group), an aryloxycarbonyloxy group (preferably a substituted or unsubstituted aryloxycarbonyloxy group having 7 to 30 carbon atoms such as a phenoxycarbonyloxy group, p-methoxyphenoxycarbonyloxy group, p-n-hexadecyloxyphenoxycarbonyloxy group), an amino group (preferably an amino group, a substituted or unsubstituted alkylamino group having 1 to 30 carbon atoms, a substituted or unsubstituted anilino group having 6 to 30 carbon atoms such as an amino group, methylamino group, dimethylamino group, anilino group, N-methylanilino group, diphenylamino group), an acylamino group (preferably a formylamino group, substituted or unsubstituted alkylcarbonylamino group having 1 to 30 carbon atoms, substituted or unsubstituted arylcarbonylamino group having 6 to 30 carbon atoms such as a formylamino group, acetylamino group, pivaloylamino group, lauroylamino group, benzoylamino group), an aminocarbonylamino group (preferably a substituted or unsubstituted aminocarbonylamino group having 1 to 30 carbon atoms such as a carbamoylamino group, N,N-dimethylaminocarbonylamino group, N,N-diethylaminocarbonylamino group, morpholinocarbonylamino group), an alkoxy carbonylamino group (preferably a substituted or unsubstituted alkoxycarbonylamino group having 2 to 30 carbon atoms such as a methoxycarbonylamino group, ethoxycarbonylamino group, tertbutoxycarbonylamino group, n-octadecyloxycarbonylamino group, N-methylmethoxycarbonylamino group), an aryloxycarbonylamino group (preferably a substituted or unsubstituted aryloxycarbonylamino group having 7 to 30 carbon atoms such as a phenoxycarbonylamino group, p-chlorophenoxycarbonylamino group, m-n-octyloxyphenoxycarbonylamino group), a sulfamoylamino group (preferably a substituted or unsubstituted sulfamoylamino group having 0 to 30 carbon atoms such as a sulfamoylamino group, N,N-dimethylaminosulfonylamino group, N-n-octylaminosulfonylamino group), an alkylsulfonylamino group/arylsulfonylamino group (preferably a substituted or unsubstituted alkylsulfonylamino group having 1 to 30 carbon atoms, a substituted or unsubstituted arylsulfonylamino group having 6 to 30 carbon atoms such as a methylsulfonylamino group, butlysulfonylamino group, phenylsulfonylamino group, 2,3,5-trichlorophenylsulfonylamino group, p-methylphenylsulfonylamino group), a mercapto group, an alkylthio group (preferably a substituted or unsubstituted alkylthio group having 1 to 30 carbon atoms such as a methylthio group, ethylthio group, n-hexadecylthio group), an arylthio group (preferably a substituted or unsubstituted arylthio group having 6 to 30 carbon atoms such as a phenylthic group, p-chlorophenylthio group, m-methoxyphenylthio group), a heterocyclicthio group (preferably a substituted or unsubstituted heterocyclicthio group having 2 to 30 carbon atoms such as a 2-benzothiazolylthio group, 1-phenyltetrazole-5-ylthio group), a sulfamoyl group (preferably a substituted or unsubstituted sulfamoyl group having 0 to 30 carbon atoms such as a N-ethylsulfamoyl group, N-(3-dodecyloxypropyl) sulfamoyl group, N,N-dimethylsulfamoyl group, N-acetylsulfamoyl group, N-benzoylsulfamoyl group, N—(N'-phenylcarbamoyl)sulfamoyl group), a sulfo group, an alkylsulfinyl group/arylsulfinyl group (preferably a substituted or unsubstituted alkylsulfinyl group having 1 to 30 carbon atoms, a substituted or unsubstituted arylsulfinyl group having 6 to 30 carbon atoms such as a methylsulfinyl group, ethylsulfinyl group, phenylsulfinyl group, p-methylphenylsulfinyl group), an alkylsulfonyl group/arylsulfonyl group (preferably a substituted or unsubstituted alkylsulfonyl group having 1 to 30 carbon atoms, a substituted or unsubstituted arylsulfonyl group having 6 to 30 carbon atoms such as a methylsulfonyl group, ethylsulfonyl group, phenylsulfonyl group, p-methylphenylsulfonyl group), an acyl group (preferably a formyl group, a substituted or unsubstituted alkylcarbonyl group having 2 to 30 carbon atoms, a substituted or unsubstituted arylcarbonyl group having 7 to 30 carbon atoms such as an acetyl group, pivaloylbenzoyl group), an aryloxycarbonyl group (preferably a substituted or unsubstituted aryloxycarbonyl group having 7 to 30 carbon atoms such as a phenoxycarbonyl group, o-chlorophenoxycarbonyl group, m-nitrophenoxycarbonyl group, p-tert-butylphenoxycarbonyl group), an alkoxycarbonyl group (preferably a substituted or unsubstituted alkoxy carbonyl group having 2 to 30 carbon atoms such as a methoxycarbonyl group, ethoxycarbonyl group, tert-butoxycarbonyl group, n-octadecylqxycarbonyl group), a carbamoyl group (preferably a substituted or unsubstituted carbamoyl group having 1 to 30 carbon atoms such as a carbamoyl group, N-methylcarbamoyl group, N,N-dimethylcarbamoyl group, N,N-di-n-octylcarbamoyl group, N-(methylsulfonyl)carbamoyl group), an aryl and heterocyclic azo group (preferably a substituted or unsubstituted arylazo group having 6 to 30 carbon atoms, a substituted or unsubstituted heterocyclic azo group having 3 to 30 carbon atoms such as a phenylazo group, p-chlorophenylaxo group, 5-ethylthio-1,3,4-thiadiazole-2-ylazo group), an imido group (preferably a N-succinimido group, N-phthalimido group), a phosphino group (preferably a substituted or unsubstituted phosphino group having 2 to 30 carbon atoms such as a dimethylphosphino group, diphenylphosphino group, methylphbenoxyphosphino group), a phosphinyl group (preferably a substituted or unsubstituted phosphinyl group having 2 to 30 carbon atoms such as a phosphinyl group, dioctyloxyphosphinyl group, diethoxyphosphinyl group), a phosphinyloxy group (preferably a substituted or unsubstituted phosphinyloxy group having 2 to 30 carbon atoms such as a diphenoxyphosphinyloxy group, dioctyloxyphosphinyloxy group), a phosphinylamino group (preferably a substituted or unsubstituted phosphinyl amino group having 2 to 30 carbon atoms such as a dimethoxyphosphinylamino group, dimethylaminophosphinylamino group), and a silyl group (preferably a substituted or unsubstituted silyl group having 3 to 30 carbon atoms such as a trimethylsilyl group, tert-butyldimethylsilyl group, phenyldimethylsilyl group).

Among these substituent, for those having a hydrogen atom, it may be removed to be substituted further with the above-described group. Examples of such functional groups include an alkylcarbonylaminosulfonyl group, an arylcarbonylaminosulfonyl group, an alkylsulfonylaminocarbonyl group and an arylsulfonylaminocarbonyl group. Examples of these groups include a methylsulfonylaminocarbonyl group, a p-methylphenylsulfonylaminocarbonyl group, an acetylaminosulfonyl group, and a benzoylaminosulfonyl group.

Among these substituents listed above, preferred are halogen atoms, alkyl groups, aryl groups, alkoxyl groups, cyano group, hydroxyl group, carboxyl group, and arylsulfonyl groups, more preferred are alkyl groups, alkoxyl groups, hydroxyl group, carboxyl group and phenylsulfonyl group.

Two or more substituents if any in one molecule may be the same or different. If possible, the substituents may be linked together to form a ring (including condensed rings with the rings described in the formulae).

The molecular weight of the short wavelength-adjuster of wavelength dispersion is preferably 100 to 5,000, more preferably 150 to 3,000, still more preferably 200 to 2,000.

The short wavelength-adjuster of wavelength dispersion is added at an amount of preferably 2 to 20% by mass, more preferably 4 to 15% by mass, particularly preferably 5 to 10% by mass of cellulose acylate.

The long wavelength-adjuster of wavelength dispersion includes for example organic compounds such as cyanine-series compounds, phthalocyanine-series compounds, naphthalocyanine-series compounds, polymethine-series compounds, thiol-series compounds, aminothiophelate-series metal complex salts, immonium-series compounds, diimmonium-series compounds, aminium-series compounds, pyrylium-series compounds, squarylium-series compounds, pyrrolopyrrole-series compounds, quaterlylene-series compounds, chroconium-series compounds, triallylmethane-series compounds, azulenium-series compounds, indophenol-series compounds, and anthraquinone-series compounds, and inorganic compounds such as aluminium salts, The long wavelength-adjuster of wavelength dispersion specifically includes various compounds disclosed in the publications of JP-A 6-256564 and JP-A 2001-208913; phthalocyanines and naphthalocyanines disclosed in for example the individual publications of JP-A 61-154888, JP-A 61-197281, JP-A-61-246091, JP-A 63-37991, JP-A 63-39388, JP-A 62-233288, JP-A 63-312889, JP-A 2-43269, JP-A 2-138382, JP-A 2-296885, JP-A 3-43461, JP-A 3-77840, JP-A 3-100066, JP-A 3-62878, JP-A 6-214113, and JP-A 10-78509; thiol-series meal complex salts disclosed in the individual publications of for example JP-B 58-56533, JP-A 62-54143, JP-B 2-4881, JP-A 4-45546, JP-A 2003-221523 and JP-A 2003-327865; aminothiophelate-series metal complex compounds disclosed in for example the publications of JP-A 63-112593 and JP-A 2001-89492; diimmonium-series compounds disclosed in the publications of JP-A 2003-96040, and JP-A 2003-327865; pyrylium-series compounds, squarylium-series compounds and chroconium-series compounds disclosed in the publications of for example JP-A 2002-286931, and JP-A 2001-194522; and anthraquinones disclosed in the individual publications of JP-A 61-291651, JP-A 61-291652, JP-A 62-15260, JP-A 62-132963, JP-A 1-129068, and JP-A 1-172458.

The long wavelength-adjuster of wavelength dispersion preferably includes for example those described below but the invention is never limited to these specific examples.

KAYASORB IRG-022 and KAYASORB IRG-040 (manufactured by Nippon Kayaku Co., Ltd.); NIR-IM1, NIR-IM2, NIR-IM3, and NIR-IM4 (manufactured by Nagase ChemteX Corporation); MIR-369 (manufactured by Yamamoto Kasei); IR-301 (manufactured by Yamada Chemical Industry); SDA4428, SDA4927, SDA5688, SDA6104, SDA7611, SDA7775, SDA9800, and SDA7047 (manufactured by H. W. SANDS); Projet830NP, and Projet900NP (manufactured by Avecia KK); and compounds IR-1 and IR-2 of the following formulae. In the structural formula of IR-1, PTS$^-$ represents p-toluenesulfone ion.

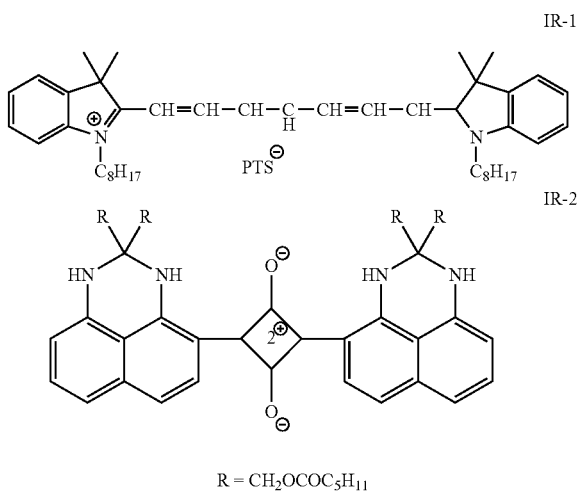

The long wavelength-adjuster of wavelength dispersion in accordance with the invention is added at an amount of preferably 0.001 to 2% by mass, more preferably 0.002 to 1% by mass, particularly preferably 0.01 to 0.5% by mass of cellulose acylate.

The long wavelength-adjuster of wavelength dispersion for use in accordance with the invention is of a molecular weight of preferably 100 to 5,000, more preferably 150 to 3,000, still more preferably 200 to 2,000.

(2-2-3) Other Additives

The film for use as the second optically anisotropic layer may contain additives other than those described above. The additives include for example plasticizers (plasticizers are preferably added at an amount of preferably 0.01 to 10% by mass of the polymer; the preferable amounts described below are also represented by amounts in % by mass of the polymer), fine particle powders of a mean particle size of 5 to 3,000 nm (at 0.001 to 1% by mass), fluorine-series surfactants (at 0.001 to 1% by mass), removers (at 0.0001 to 1% by mass), stabilizers (at 0.0001 to 1% by mass), and controllers of optical anisotropy (at 0.01 to 10% by mass) The additives may also be added at liquid states or solid states during the film preparation process Preferably, any additives for use in the polymer film in accordance with the invention substantially never evaporate in the drying course. Herein, these additives may be used singly or in combination of two or more types of additives. Plasticizers and controllers of optical anisotropy The plasticizers and the controllers of optical anisotropy are organic compounds of molecular weights of 3,000 or less, preferably compounds with hydrophobic moieties and hydrophilic moieties. These compounds are aligned between polymer chains, so that the retardation value is modified. Further, these compounds are used in combination with cellulose acylate to be particularly preferably used in accordance with the invention to improve the hydrophobicity of the resulting film and reduce the change of the retardation due to humidity.

Specifically, the plasticizers and the controllers of optical anisotropy include for example compounds with preferably one or more aromatic rings, more preferably two to 15 aromatic rings, more preferably three to 10 aromatic rings. Individual atoms in the compounds except the aromatic rings are preferably in such arrangements that the atoms are approximately on the same plane. In case that the compounds have plural aromatic rings, the aromatic rings are in such arrangement that the aromatic rings are approximately on the same plane. So as to selectively raise Rth, further, the state of the additives existing in the film is preferably such that the plane of the aromatic rings exists along the direction parallel to the film plane.

The plasticizers and the controllers of optical anisotropy may be used singly or may be used in combination of two or more types of the additives.

Specifically, the plasticizers and the controllers of optical anisotropy with the effect of raising Rth include for example the plasticizers described in the publication of JP-A 2005-104148 on pages 33 to 34 and the controllers of optical anisotropy as described in the publication of JP-A 2005-104148 on pages 38 to 89.

Stabilizers

The stabilizers are added so as to reduce the coloring and thermal deterioration of cellulose acylate during the heat treatment process and are compounds suppressing the decomposition and modification of the cellulose acylate polymer itself. The stabilizers are selected from anti-oxidants, radical inhibitors, peroxide-decomposing agents, metal inactivators, acid captures, and light stabilizers. In accordance with the invention, any stabilizer may be used. Among the stabilizers, an anti-oxidant and a radical inhibitor may preferably be used. More preferably, an anti-oxidant may be used.

The anti-oxidant preferably includes for example phosphate-series compounds with phosphate backbone, sulfur-series compounds with thioether structure, phosphate ester-series compounds with pentaerythritol backbone, or lactone-series compounds with lactone structure; the radical inhibitor preferably includes for example phenolic compounds with aromatic ring substituted with hydroxyl group, and amine-series compounds with substituted or unsubstituted amino group; the peroxide-decomposing agents preferably include for example phenolic compounds, and amine-series compounds; the metal inactivators preferably include for example amide-series compounds with amide bond; the acid captures preferably include for example epoxy-series compounds with epoxy group; the light stabilizers preferably include for example amine-series compounds.

These stabilizers may be used singly or in combination of two or more types of such stabilizers or may be compounds with two or more functions within one molecule.

The stabilizers are preferably at sufficiently low volatility at high temperature and preferably contain at least one stabilizer type of a molecular weight of 500 or more. Further, the molecular weight is preferably 500 to 4,000, more preferably 530 to 3,500, particularly preferably 550 to 3,000. When the molecular weight is 500 or more, the thermal volatility Can readily be suppressed to a low value; when the molecular weight is 4,000 or less, further, the compatibility with cellulose acylate is more improved.

As the stabilizers, commercially available stabilizers may also be used. For example, phosphate ester-series anti-oxidants with pentaerythritol backbone may preferably be used, including for example cyclic neopentane tetra-il-bis(2,6-di-t-butyl-4-methylphenyl)phosphite ["ADEKASTAB PEP-36" manufactured by ADEKA].

(2-3) Method for Producing Film for use in Second Optically Anisotropic Layer

The film for use as the second optically anisotropic layer can be produced by for example a film production process by solution casting from a polymer solution containing the polymer and various additives. The film for use as the second optically anisotropic layer for use in the method of the invention may also be produced by the melt casting process for film production with no use of the polymer solution. The melt casting process for film production comprises heating and melting a polymer and casting the polymer on a support, and then cooling the polymer to form a film. When the melting point of the polymer or the melting point of a mixture of the polymer and various additives is lower than the decomposition temperatures of them and higher than the drawing temperature, the melt casting process for film production may be used. The melt casting process for film production is described in for example the publication of JP-A 2000-352620.

In accordance with the invention, the solution casting process for film production is preferably selected as the method for producing the film for use as the second optically anisotropic layer.

The procedures of the solution casting process for film production are specifically described hereinbelow.

(2-3-1) Preparation of Polymer Solution for Film for use as the Second Optically Anisotropic Layer The polymer solution containing the polymer and various additives can be prepared by preparative methods described in for example the publications of JR-A 58-127737, JP-A 61-106628, JP-A 2-276830, JP-A 4-259511, JP-A 5-163301, JP-A 9-95544, JP-A 10-45950, JP-A 10-95854, JP-A 11-71463, JP-A 11-302388, JP-A 11-322946, JP-A 11-322947, JP-A 11-323017, JP-A 2000-53784, JP-A 2000-273184 and JP-A 2000-273239. Specifically, the polymer and a solvent are mixed together under agitation for swelling, and may sometimes be dissolved under cooling or heating; and the resulting mixture is filtered to obtain a polymer solution. As the polymer solution, a composition containing the compound with a negative intrinsic birefringence (the polymer described above) and the compound with the absorption peak at 250 to 400 nm (the short wavelength-adjuster of wavelength dispersion) is preferably used. As the polymer solution, additionally, a composition containing the compound with a negative intrinsic birefringence (the polymer described above) and the compound with the absorption peak at 700 to 1200 nm (the long wavelength-adjuster of wavelength dispersion) is preferably used as well. Furthermore, a composition containing the polymer, the short wavelength-adjuster of wavelength dispersion and the long wavelength-adjuster of wavelength dispersion is more preferably used.

The polymer concentration in the prepared polymer solution is preferably 5 to 40% by mass, more preferably 10 to 30% by mass, most preferably 15 to 30% by mass. The polymer concentration may be adjusted to a given concentration at a stage of dissolving the polymer in the solvent. Additionally, a solution at a low concentration (for example, 4 to 14% by mass) is preliminarily prepared, from which the solvent is evaporated for concentrating the solution. Furthermore, a solution at a high concentration is preliminarily prepared and then diluted. The polymer concentration may be lowered by adding such additives.

The main solvent used in producing the polymer solution (preferably cellulose ester solution) is preferably an organic solvent, a good solvent for the polymer. Preferably, the organic solvent has a boiling point of not higher than 80° C. from the viewpoint of reducing the drying load. The boiling point of the organic solvent is more preferably from 10 to 80° C., even more preferably from 20 to 60° C. As the case may be an organic solvent having a boiling point of from 30 to 45° C. may also be favorably used as the main solvent.

The main solvent includes halogenohydrocarbons, esters, ketones, ethers, alcohols and hydrocarbons; and these may have a branched structure or a cyclic structure. The main solvent may have two or more functional groups of ester, ketone, ether and alcohol (i.e., —O—, —CO—, —COO—, —OH). The hydrogen atom in the hydrocarbon moiety of the above ester, ketone, ether and alcohol may be substituted with a halogen atom (especially, fluorine atom). The main solvent of the polymer solution (preferably cellulose ester solution) for use in the production of a film for the second optical anisotropic layer is, when a single solvent is used in the polymer solution, that single solvent; but when plural solvents are used in the polymer solution, then the solvent having a highest mass fraction of those constitutive solvents is the main solvent. As the main solvent, preferred are halogenohydrocarbons.

The halogenohydrocarbon is preferably a chlorohydrocarbon, for example, including dichloromethane and chloroform. More preferred is dichloromethane.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolane, 4-methyldioxolane, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent that may be used along with the main solvent includes halogenohydrocarbons, esters, ketones, ethers, alcohols, and hydrocarbons These may have a branched structure or a cyclic structure. The organic solvent may have two or more functional groups of ester, ketone, ether and alcohol (i.e., —O—, —CO—, —COO—, —OH). The hydrogen atom in the hydrocarbon moiety of the above ester, ketone, ether and alcohol may be substituted with a halogen atom (especially, fluorine atom).

The halogenohydrocarbon is preferably a chlorohydrocarbon, for example, including dichloromethane and chloroform. More preferred is dichloromethane.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolane, 4-methyl-dioxolane, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol. Preferred are alcohols having from 1 to 4 carbon atoms; more preferred are methanol, ethanol, butanol; most preferred are methanol, butanol.

The hydrocarbon includes, for example, n-pentane, cyclohexane, n-hexane, benzene, toluene, xylene.

The organic solvent having at least two functional groups include, for example, 2-ethoxyethyl acetate, 2-methoxyethanol, 2-butoxyethanol, methyl acetacetate.

When the polymer used in a film for the second optical anisotropic layer has a hydrogen-bonding functional group such as hydroxyl group, ester or ketone, then the solvent preferably contains alcohol in an amount of from 5 to 30% by mass of the overall solvent, more preferably from 7 to 25% by mass, even more preferably from 10 to 20% by mass, from the viewpoint of reducing the peeling load from the casting support. The polymer having a hydrogen-bonding functional group includes cellulose acylate.

Controlling the alcohol content makes it possible to readily control the Re and Rth expressibility of the film for the second optical anisotropic layer. Concretely, increasing the alcohol content makes it possible to relatively lower the heat-treatment temperature and to increase the ultimate range of Re and Rth.

It is desirable that the polymer solution to be used in producing the film for the second optical anisotropic layer for use in the production method of the invention contains an organic solvent which has a boiling point of at least 95° C. and has an evaporation profile of such that its proportion to evaporate along with halogenohydrocarbon in the initial stage of drying is small and then it is gradually concentrated and which is a poor solvent for cellulose ester, in an amount of from 1 to 15% by mass, more preferably from 1.5 to 13% by mass, even more preferably from 2 to 10% by mass.

Hereinunder described are preferred examples of a combination of organic solvents that are favorably used as a solvent for the polymer solution to be used in producing the film for the second optical anisotropic layer for use in the production method of the invention, to which, however, the invention should not be limited. The numerical value for the ratio means part by mass.

(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10
(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3
(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolane/methanol/butanol=70/15/5/10
(14) dichloromethane/dioxane/acetone/methanol/butanol=75/5/10/5/5
(15) dichloromethane/acetone/cyclopentanone/ethanol/isobutyl alcohol/cyclohexane=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol=65/15/10/10
(19) dichloromethane/cyclopentanone/ethanol/butanol=85/7/3/5
(20) dichloromethane/methanol/butanol=83/15/2
(21) dichloromethane=100
(22) acetone/ethanol/butanol=80/15/5
(23) methyl acetate/acetone/methanol/butanol=75/10/10/5
(24) 1,3-dioxolane=100
(25) dichloromethane/methanol=85/15
(26) dichloromethane/methanol=92/8
(27) dichloromethane/methanol=90/10
(28) dichloromethane/methanol=87/13
(29) dichloromethane/ethanol=90/10
(30) dichloromethane/methanol/butanol=80/19/1

The details of a case where a non-halogen organic solvent is the main solvent are described in Hatsumei Kyokai Disclosure Bulletin (No. 2001-1745, published by the Hatsumei Kyokai on Mar. 15, 2001), and they may be suitably referred to herein.

The invention may include cooling and/or heating the mixture of polymer and solvent for the purpose of improving the solubility of the polymer in the solvent.

In the case where a halogen-containing organic solvent is used as the solvent and a cellulose acylate as the polymer and when the mixture of polymer and solvent is cooled, it is desirable that the mixture is cooled to −100 to 10° C. Also preferably, the method includes swelling the mixture at −10 to 39° C. prior to the cooling step, and includes heating it at 0 to 39° C. after the cooling step.

In the case where a halogen-containing organic solvent is used as the solvent and the mixture of polymer and solvent is heated, it is desirable that method includes dissolving cellulose acylate in the solvent according to at least one process selected from the following (a) or (b):
(a) The mixture is swollen at −10 to 39° C., and the resulting mixture is heated at 0 to 39° C.
(b) The mixture is swollen at −10 to 39° C., then the resulting mixture is heated under 0.2 to 30 MPa and at 40 to 240° C., and the heated mixture is cooled to 0 to 39° C.

In the case where a halogen-free organic solvent is used as the solvent and the mixture of cellulose acylate and solvent is cooled, the method preferably includes cooling the mixture to −100 to −10° C. Also preferably, the method includes swelling the mixture at −10 to 55° C. prior to the cooling step, and heating it at 0 to 57° C. after the cooling step.

In the case where a halogen-containing organic solvent is used as the solvent and the mixture of polymer and solvent is heated, it is desirable that method includes dissolving cellulose acylate in the solvent according to at least one process selected from the following (c) or (d):

(c) The mixture is swollen at −10 to 55° C., and the resulting mixture is heated at 0 to 57° C.

(d) The mixture is swollen at −10 to 55° C., then the resulting mixture is heated under 0.2 to 30 MPa and at 40 to 240° C., and the heated mixture is cooled to 0 to 57° C.

(2-3-2) Formation of a Film for use as the Second Optical Anisotropic Layer

The film for use as the second optical anisotropic layer may be produced according to a solution casting method using the above-mentioned polymer solution. The solution casting method may be attained in any ordinary manner, using an ordinary apparatus. Concretely, a dope (polymer solution) prepared in a dissolver (tank) is filtered, and then it is once stored in a storage tank in which the dope is defoamed to be a final dope. The dope is kept warmed at 30° C., and fed into a pressure die from the dope take-out port, for example, via a pressure meter gear pump via which a predetermined amount of the dope may be accurately fed to the die by controlling the revolution thereof, and then the dope is then uniformly cast onto a metal support in the casting zone that runs endlessly, through the slit of the pressure die (casting step). Next, at the peeling point at which the metal support runs almost one-round, a wet dope film (this may be referred to as a web) is peeled from the metal support, and then transported to a drying zone, in which the web is dried while transported therein by rolls. The details of the casting step and the drying step of the solution casting method are described in JP-A 2005-104148, pp. 120-146, and are suitably applicable to the invention.

In the invention, a metal band or a metal drum may be used as the metal support for use in formation of the film for use as the second optical anisotropic layer before the heat treatment.

In controlling the retardation of the film for use as the second optical anisotropic layer, it is desirable that the mechanical history to be given to the film for the second optical anisotropic layer, or that is, the external force to be applied to the polymer web during the film formation step is controlled. Concretely, in the case where the produced film for the second optical anisotropic layer has a large Re and has negative Rth, the polymer web is stretched preferably by from 0.1% to less than 15%, more preferably from 0.5 to 10%, even more preferably from 1 to 8%. In the case where the un-heat-treated film for the second optical anisotropic layer is produced while transported, it is preferably stretched in the film-traveling direction. The residual solvent amount in the polymer web to be stretched is computed according to the following equation, and is from 5 to 1000%. Preferably, the residual solvent amount is from 10 to 200%, more preferably from 30 to 150%, even more preferably from 40 to 100%.

$$\text{Residual Solvent Amount (\% by mass)} = \{(M-N)/N\} \times 100$$

wherein M means the mass of the film for the second optical anisotropic layer just before inserted into the stretching zone; and N means the mass of the film for the second optical anisotropic layer just before inserted into the stretching zone, dried at 110° C. for 3 hours.

In the case where the polymer web has a large Re and a positive Rth, it is preferably stretched by from 15 to 300%, more preferably from 18 to 200%, even more preferably from 20 to 100%. In the case where the un-heat-treated polymer film is produced while transported, it is preferably stretched in the film-traveling direction. The residual solvent amount in the polymer web to be stretched is computed according to the above equation, and is from 5 to 1000%. Preferably, the residual solvent amount is from 30 to 500%, more preferably from 50 to 300%, even more preferably from 80 to 250%.

The draw ratio (elongation) of the polymer web in stretching may be attained by the peripheral speed difference between the metal support speed and the peeling speed (peeling roll draw). The stretching may control the retardation expressibility of the stretched film.

When the film having a residual solvent amount of at least 5% is stretched, then its haze may be large, but when the film having a residual solvent amount of at most 1000% is stretched, then the external force give to the polymer chains may be readily transmitted thereto and the effect of the retardation expression control by stretching the solvent-containing polymer web may be thereby enhanced. The residual solvent amount in the polymer web may be suitably controlled by changing the concentration of the polymer solution, the temperature and the speed of the metal support, the temperature and the flow rate of the drying air, and the solvent gas concentration in the drying atmosphere.

In the polymer web stretching step, the web surface temperature is preferably lower from the viewpoint of transmitting the external force to the polymer. The web temperature is preferably from $(T_s-100)$ to $(T_s-0.1)°$ C., more preferably from $(T_s-50)$ to $(T_s-1)°$ c., even more preferably from $(T_s-20)$ to $(T_s-3)°$ C. In this, $T_s$ means the surface temperature of the casting support. In the case where the temperature of the casting support is so set that it varies in different sites, then $T_s$ indicates the surface temperature of the support center.

Thus stretched, the polymer web is then transported into a drying zone, in which it is clipped with a tenter at both edges, and while transported with rolls, it is dried.

The residual solvent amount in the thus-dried film is preferably from 0 to 2% by mass, more preferably from 0 to 1% by mass. After dried, the film may be transported to a heat-treatment zone, or after the film is once wound up, it may be subjected to off-line heat treatment. Preferably, the transparent polymer film before heat treatment has a width of from 0.5 to 5 m, more preferably from 0.7 to 3 m. In the case where the film is once wound up, then the preferred length of the wound film is from 300 to 30000 m, more preferably from 500 to 10000 m, even more preferably from 1000 to 7000 m.

The moisture permeability of the formed film for use as the second optical anisotropic layer is preferably at least 100 g/(m²·day) in terms of the film having a thickness of 80 μm, more preferably from 100 to 1500 g/(m²·day), even more preferably from 200 to 1000 g/(m²·day), still more preferably from 300 to 800 g/(m²·day). In order to produce a film for use as the second optical anisotropic layer, having a moisture permeability of at least 100 g/(m²·day) in terms of the film having a thickness of 80 μm, it is desirable that the polymer hydrophilicity/hydrophobicity is suitably controlled, or the film density is lowered. For the former method, for example, the hydrophilicity/hydrophobicity of the polymer backbone chain may be suitably controlled, and hydrophobic or hydrophilic side chains may be introduced into the polymer. For the latter method, for example, side chains may be introduced into the polymer backbone chain, or the solvent for use in film formation is suitably selected, or the drying speed in film formation may be controlled.

(2-3-3) Preliminary Stretching

The un-heat-treated film for use as the second optical anisotropic layer, from which the solvent was evaporated away and which has a residual solvent content (computed according to the above equation) of less than 5%, may preferably be preliminary stretched before heat treatment (hereinafter this stretching is referred to as preliminary stretching). The preliminary stretching may further control the Re and Rth expressibility in the heat-treatment step. Concretely, within the range mentioned below, the stretching temperature is changed and the draw ratio in stretching is increased, whereby the heat-treatment temperature may be set relatively low and the ultimate range of Re and Rth may be enlarged. Not overstepping the sprit and the scope of the invention, any other step may be provided between the preliminary stretching step and the heat treatment step.

It is desirable that the preliminary stretching is attained at from $(T_{g0}-20)$ to $(T_{g0}+50)°$ C. $T_{g0}$ (unit, ° C.) means the glass transition temperature of the film for the second optical anisotropic layer before the heat treatment. The preliminary stretching temperature is more preferably from $(T_{g0}-10)$ to $(T_{g0}+45)°$ C., even more preferably from $T_{g0}$ to $(T_{g0}+40)°$ C., most preferably from $(T_{g0}+5)$ to $(T_{g0}+35)°$ C.

The preliminary stretching direction is not specifically defined. In the case where the un-heat-treated film for the second optical anisotropic layer is transported, it may be stretched in the film-traveling direction (machine-direction stretching), or may be stretched in the direction perpendicular to the film-traveling direction (cross-direction stretching) Preferred is machine-direction stretching because the film can be laminated on a polarizer by roll-to-roll during a production process of a polarizing plate. For the method of machine-direction stretching and cross-direction stretching and its preferred embodiments, referred to the section of the heat treatment given hereinunder. Preferably, the draw ratio in preliminary stretching is from 1 to 500%, more preferably from 3 to 400%, even more preferably from 5 to 300%, still more preferably from 10 to 100%. The preliminary stretching may be a one-stage process or a multi-stage process. "Draw ratio in preliminary stretching (%)" as referred to herein means the following:

Draw ratio in preliminary stretching (%)=100×{ (length after stretching)−(length before stretching)}/(length before stretching).

The pulling speed in the preliminary stretching is preferably from 10 to 10000%/min, more preferably from 20 to 1000%/min, even more preferably from 30 to 800%/min.

(2-3-4) Heat Treatment

In producing the film for use as the second optically anisotropic layer in accordance with the invention, heat treatment at a heat treatment temperature T (unit: ° C.) satisfying the condition of the following formula (1) is preferably done. The heat treatment is preferably carried out for the web drawn at the preliminary drawing step. The heat treatment is preferably carried out while the web is transferred.

$$T_{g0} < T < T_{m0} \qquad \text{Formula (1):}$$

wherein $T_{g0}$ represents the glass transition temperature (unit: ° C.) of the film for use as the second optically anisotropic layer before the heat treatment and $T_{m0}$ represents the melting point (unit: ° C.) of the film for use as the second optically anisotropic layer before the heat treatment.

Via the heat treatment step, the negative birefringence of the polymer is enhanced so that desired Re and Rth are readily obtained. When the heat treatment temperature T is higher than $T_{g0}$, sufficient retardation is likely exerted. When the heat treatment temperature T is less than $T_{m0}$, the polymer is readily handled to produce the film.

In the formula (1), $T_{g0}$ represents the glass transition temperature (unit: ° C.) of the film for use as the second optically anisotropic layer before the heat treatment. Herein, the term "glass transition temperature" means the border temperature at which the motility of the polymer composing the film for use as the second optically anisotropic layer greatly changes. The glass transition temperature can be measured by the method described below.

The heat treatment temperature T preferably satisfies the following formula (2).

$$T_{c0} \leqq T < T_{m0} \qquad \text{Formula (2):}$$

In the formula (2), $T_{c0}$ represents the crystallization temperature (unit: ° C.) of the film for use as the second optically anisotropic layer before the heat treatment. In accordance with the inventions the term "polymerization temperature" means the temperature at which the polymer composing the film for use as the second optically anisotropic layer forms a regular periodic structure. When the temperature exceeds the polymerization temperature, a structure observed by X ray diffraction can rapidly grow.

When the heat treatment temperature T is higher than $T_{c0}$, the structure observed by X ray diffraction grows and may possibly adjust the retardation. By carrying out a drawing step before the heat treatment, the polymer can be aligned at a certain level along the drawing direction. At the heat treatment step, therefore, the structure observed by X ray diffraction can grow efficiently and anisotropically. When the drawing temperature at the drawing step is lower than the heat treatment temperature, the polymer can be aligned without any growth of the structure observed by X ray diffraction. Hence, the structure observed by X ray diffraction can grow efficiently at the following heat treatment step, advantageously. From the viewpoints of the reduction of the heat treatment temperature and the enlargement of the ranges achievable by Re and Rth, the drawing direction at the drawing step more preferably coincides with the transfer direction during the heat treatment.

By thermally treating the film for use as the second optically anisotropic layer at the temperature T satisfying the conditions of the formulae (1) and (2), the exertion of the retardation of the film for use as the second optically anisotropic layer can be adjusted. Particularly, Re can be raised. By thermally treating the temperature T satisfying the condition of the formula (2), Re is generally raised by 15 nm or more, preferably 25 nm or more, more preferably 50 nm or more, compared with Re before the heat treatment. Re is raised by still more preferably 100 nm or more, far more preferably 150 nm or more, and particularly preferably 200 nm or more. The increment of Re can be controlled by the conditions for the preliminary drawing described above (temperature and ratio), the conditions for the heat treatment (temperature in particular) and the like.

In the thermal treatment step, the film for the second optical anisotropic layer is preferably heat-treated while transported. The transporting method for the film for the second optical anisotropic layer is not specifically defined. As typical examples, the film may be transported with nip rolls or a suction drum, or may be transported while held with tenter clips (transported while floated by pneumatic pressure). Preferred is the method of transporting the film with nip rolls. Concretely, one embodiment is as follows: At least in the zone before heat treatment, nip rolls are set, and a polymer film to be processed is led to pass between the nip rolls and is thus transported.

The film-traveling speed is generally from 1 to 500 m/min, preferably from 5 to 300 m/min, more preferably from 10 to 200 m/min, even more preferably from 20 to 100 m/min. When the film-traveling speed is at least the above-mentioned lowermost limit, 1 m/min, then the method is favorable as capable of securing a Sufficient industrial producibility; and when it is at most the above-mentioned highest limit of 500 m/min, then the method is also favorable for the capability of good crystal growth promotion within a practical heat treatment zone length When the film-traveling speed is higher, then the film coloration may be prevented more; and when it is lower, the heat treatment zone length may be shorter. Preferably, the film-traveling speed during heat treatment (the device speed of the nip rolls and the suction drum that determines the film-traveling speed) is kept constant.

The heat treatment in the production method of the invention includes, for example, a method of leading the film for the second optical anisotropic layer to run in a zone having a temperature T while transported through it; a method of applying hot air to the film for the second optical anisotropic layer being transported; a method of irradiating the film for the second optical anisotropic layer being transported with heat rays; and a method of contacting the film for the second optical anisotropic layer with a heated roll.

Preferred is the method of leading the film for the second optical anisotropic layer to run in a zone having a temperature T while transported through it. One advantage of the method is that the film for the second optical anisotropic layer may be heated uniformly. The temperature inside the zone may be controlled and kept constant at T by a heater while monitoring with, for example, a temperature sensor. The traveling length of the film for the second optical anisotropic layer running in the zone at a temperature T may vary depending on the property of the film for the second optical anisotropic layer to be produced and on the film-traveling speed; but in general, it is preferably so set that the ratio of (traveling length)/(width of the traveling film for the second optical anisotropic layer) could be from 0.1 to 100, more preferably from 0.5 to 50, even more preferably from 1 to 20. In this application, the ratio may be referred to as an aspect ratio. The film-running time in the zone at a temperature T (heat treatment time) may be generally from 0.01 to 60 minutes, preferably from 0.03 to 10 minutes, more preferably from 0.05 to 5 minutes. Within the range, the retardation expressibility may be excellent and the processed film may be prevented from being colored.

The film for the second optical anisotropic layer may be stretched simultaneously with its heat treatment. The stretching direction in the heat treatment is not specifically defined. When the un-heat-treated film for the second optical anisotropic layer is anisotropic, then it is stretched in the alignment direction of the polymer constituting the film. "Anisotropic film" as referred to herein means that the ratio of the sound wave propagating speed through the film in the direction in which the sound wave propagating speed is the largest to the sound wave propagating speed in the direction perpendicular to the former direction is preferably from 1.01 to 10.0, more preferably from 1.1 to 5.0, even more preferably from 1.2 to 2.5. The sound wave propagating speed in the direction in which the sound wave propagating speed is the largest and that in other directions may be determined as follows: The film to be tested is conditioned at 25° C. and a relative humidity of 60% for 24 hours, and then, using an alignment tester (SST-2500, by Nomura Shoji), the sound wave propagating speed in a direction in which the propagating speed of the longitudinal wave vibration of an ultrasonic pulse is the largest and that in the other directions are determined.

For example, when the film for the second optical anisotropic layer is heat-treated while transported, using an apparatus with a heating zone between two nip rolls, the revolution speed of the nip rolls on the side of the inlet port of the heating zone is set higher than the revolution speed of the nip rolls on the side of the outlet port thereof, whereby the film for the second optical anisotropic layer may be stretched in the film-traveling direction (machine direction). On the other hand, both edges of the film for the second optical anisotropic layer may be held by tenter clips and the film may be led to pass through a heating zone while it is expanded in the direction perpendicular to the film-traveling direction (cross direction), whereby the film may be stretched. Stretching the film for the second optical anisotropic layer being heat-treated in the film-traveling direction makes it possible to well control the retardation expressibility of the film. The draw ratio in stretching in the film-traveling direction may be generally from 0.8 to 100 times, preferably from 1.0 to 10 times, more preferably from 1.2 to 5 times. Stretching the film for the second optical anisotropic layer being heat-treated in the direction perpendicular to the film-traveling direction makes it possible to better the surface property of the film for the second optical anisotropic layer after the heat treatment. The draw ratio in stretching in the direction perpendicular to the film-traveling direction may be generally from 0.8 to 10 times, preferably from 1.0 to 5 times, more preferably from 1.1 to 3 times. The pulling speed during the stretching is preferably from 20 to 10000%/min, more preferably from 40 to 1000%/min, even more preferably from 50 to 500%/min.

During heat treatment, the film for the second optical anisotropic layer may be shrunk. The shrinking is preferably attained simultaneously with heat treatment. Shrinking the film for the second optical anisotropic layer during heat treatment makes it possible to control the optical properties and/or mechanical properties of the film. The step of shrinking the film in the cross direction may be attained not only simultaneously with heat treatment but also before and/or after heat treatment. The step of shrinking the film in the cross direction may be attained in one stage, or the shrinking step and the stretching step may be repeated. The degree of shrinkage in shrinking the film is preferably from 5 to 80%, more preferably from 10 to 70%, even more preferably from 20 to 60%, most preferably from 25 to 50%. The shrinking direction is not specifically defined. In the case where the film for the second optical anisotropic layer before heat treatment is formed while transported, then the film is preferably shrink in the direction perpendicular to the direction in which the film being produced is transported. In the case where the film is stretched (for preliminary stretching) prior to shrinking it, the film is shrunk in the direction perpendicular to the direction in which the film is stretched. The degree of shrinkage may be controlled by suitably controlling the heat treatment temperature and/or by controlling the external force given to the film. Concretely, in the case where the edges of the film are held by tenter clips, the degree of shrinkage of the film may be controlled by changing the ratio of expansion of the rail-to-rail distance of the tenter. On the other hand, in the case where the edges of the film are not fixed but the film is held only by a device for fixing the film in the film-traveling direction, for example, by nip rolls or the like, then the degree of shrinkage of the film may be controlled by controlling the distance of the device that fixes the film in the film-traveling direction, or by changing the tension given to the film, or by changing the quantity of heat given to the film. The degree of shrinkage of the film in the cross direction may be determined from the data of the overall width of the film measured just before and after its shrinkage, according to the following equation.

Degree of shrinkage in cross direction(%)=100×(overall width just before shrinkage−overall width just after shrinkage)/(overall width just before shrinkage)

The heat treatment may be attained only once or plural times. Heat treatment in plural times means that after the previous heat treatment, the film is once cooled to a temperature lower than $Tg_0$, and then again heated up to a temperature of from $Tg_0$ to lower than $Tm_0$, and heat-treated at that temperature while transported. In the heat treatment in plural times, it is desirable that the draw ratio in stretching the film satisfies the above-mentioned range after completion of all the steps of heat treatment. Preferably, in the production method of the invention, the heat treatment is attained at most three times, more preferably at most two times, most preferably at a time.

(2-3-5) Cooling after Heat Treatment

After heat-treated, the film for the second optical anisotropic layer is cooled to a temperature lower than Tc. The cooling temperature is not specifically defined. Preferably, the film is cooled at a speed of from 100 to 1,000,000° C./min, more preferably from 1,000 to 100,000° C./min, even more preferably from 3,000 to 50,000° C./min. The temperature range for cooling the film at such a cooling speed is preferably at least 50° C., more preferably from 100 to 300° C., even more preferably from 150 to 280° C., still more preferably from 180 to 250° C.

Controlling the cooling speed in that manner makes it possible to well control the retardation expressibility of the obtained film for the second optical anisotropic layer (especially cellulose acylate film). Concretely, when the cooling speed is made high, then the retardation expressibility may be improved. In that case, in addition, the polymer chain alignment distribution in the thickness direction of the cellulose acylate film may be reduced, and the moisture-dependent curl of the film may be prevented. The effect may be attained more favorably when the temperature range of the film cooled at a relatively rapid cooling speed is controlled to fall within the above-mentioned preferred range.

The cooling speed may be controlled by providing a cooling zone held at a temperature lower than that in the heating zone, after the heating zone and transporting the film for the second optical anisotropic layer in those zones in order, or by contacting the film with a cooling roll, or by spraying cold air onto the film, or by dipping the film in a cooled liquid. The cooling speed is not required to be all the time constant during the heating step, but in the initial stage of the cooling step and in the end stage thereof, the cooling speed may be low, while between them the cooling speed may be high. The cooling speed may be determined by measuring the temperature of the film surface at different points by thermocouples disposed on the film surface, as described in Examples given hereinunder.

(2-3-6) Stretching after Heat Treatment

In the production method of the invention, the film for the second optical anisotropic layer may be subsequently stretched after its heat treatment. The stretching after heat treatment may be attained after the heat-treated film for the second optical anisotropic layer is cooled to a temperature lower than Tc, or may also be attained while the film is kept at the heat treatment temperature but is not cooled. In the case where the polymer film is once cooled, then it may be spontaneously left cooled to have a temperature lower than Tc, or may be forcedly cooled to have a temperature lower than Tc. As the case may be, the film once cooled may be again heated up to a temperature lower than Tc. In the case where the film is once cooled, the cooling temperature is preferably lower by at least 50° C. than the heat treatment temperature, more preferably lower than it by from 100 to 300° C., even more preferably by from 150 to 250° C. When the cooling temperature is lower by at least 50° C. than the heat treatment temperature, then the ratio Rth/Re of the heat-treated film may be readily controlled. Preferably, the film is once cooled to a cooling temperature, then again heated up to a temperature lower than Tc, and stretched in the condition. The difference between the heat treatment temperature and the stretching temperature is preferably at least 1° C., more preferably from 10 to 200° C., even more preferably from 30 to 150° C., still more preferably from 50 to 100° C. Suitably setting the temperature difference within the range makes it possible to well control the ratio Rth/Re of the processed film. Concretely, when the difference between the heat treatment temperature and the stretching temperature is large, then Rth/Re may increase; but when it is small, then Rth/Re change may be small.

Regarding the stretching method, the methods described in the explanation of stretching during heat treatment may be employed. The stretching may be attained in one stage or in plural stages. Preferred is the above-mentioned method of stretching the film in the film-traveling direction by changing the revolution speed of nip rolls, and the method of stretching it by holding both edges of the film for the second optical anisotropic layer with tenter clips and expanding it in the direction perpendicular to the film-traveling direction. A more preferred embodiment is as follows: The film is not stretched during heat treatment, or is stretched in the film-traveling direction by changing the revolution speed of nip rolls, and then, after the heat treatment, both edges of the heat-treated film are held with tenter clips and expanding it in the direction perpendicular to the film-traveling direction, thereby stretching the film.

The draw ratio in stretching may be suitably defined in accordance with the necessary retardation of the film for the second optical anisotropic layer. Preferably, it is from 1 to 500%, more preferably from 3 to 400%, even more preferably from 5 to 300%, still more preferably from 10 to 100%. The pulling speed is preferably from 10 to 10000%/min, more preferably from 20 to 1000%/min, even more preferably from 30 to 800%/min.

The stretching after the heat treatment may control Re and Rth of the obtained film for the second optical anisotropic layer. For example, when the stretching temperature after the heat treatment is high, then Rth of the film may be lowered not so much changing Re thereof. When the draw ratio in stretching after the heat treatment is high, then Re of the film may be lowered and Rth thereof may be increased. These have a nearly linear relationship, and therefore, suitably selecting the stretching condition after the heat treatment facilitates the production of films having desired Re and Rth.

(2-3-7) Surface Treatment

So as to improve the adhesion of the film for use as the second optically anisotropic layer to the first optically anisotropic layer or the polarizing film, the film is preferably subjected to a surface treatment. Specific methods therefor include for example Corona discharge process, glow discharge process, flame treatment, acid treatment, alkali treatment or ultraviolet irradiation process. Additionally, an undercoat is preferably arranged on the film.

From the standpoint of retaining the planar property of the film, the temperature of the cellulose acylate film is preferably Tg (glass transition temperature) or less during these treatments or processes.

In case that the film is used as a transparent protective film for the polarizing plate, cellulose acylate is particularly preferably treated with an acid treatment or an alkali treatment, namely a saponification process, from the standpoint of the adhesion to the polarizing film. Hereinbelow, the alkali saponification treatment is exemplified for specifically describing the process.

The alkali saponification treatment is preferably done at a cycle comprising immersing the film surface in an alkali solution, neutralizing the alkali solution with an acidic solution, and then washing the film with water and drying the film.

The alkali solution includes for example potassium hydroxide solution, and sodium hydroxide solution. The normality of the hydroxide ion in the alkali solution is within a range of preferably 0.1 to 3.0 N, more preferably 0.5 to 2.0 N. The temperature of the alkali solution is within a range of preferably room temperature to 90° C., more preferably 40 to 70° C.

The surface energy of the film after the surface treatment is preferably 55 mN/m or more, more preferably 60 mN/m or more to 75 mN/m or less.

As described in the textbook "Fundamentals and Applications of Wetting ("Nure no Kiso to Oyo" as Japanese title)", issued by Realize Press, in Dec. 10, 1989, the surface energy of a solid can be determined by the contact angle method, the wet heat method, and the adsorption methods. In case of the cellulose acylate film in accordance with the invention, the contact angle method is preferably used.

By dropwise adding two types of solutions with known surface energy levels to the cellulose acylate film, determining the angle between the tangential line toward the droplet and the film surface at the intersection point between the surface of the droplet and the film surface and then defining the angle on the side including the droplet as the contact angle, specifically, the surface energy of the film can be calculated.

(3) Method for Producing Optical Compensatory Film in Accordance with the Invention The optical compensatory film of the invention can be prepared by arranging the first optically anisotropic layer comprising a liquid crystal compound on the film for use as the second optically anisotropic layer as prepared in the manner described above. In this case, an alignment layer is preferably arranged between the film for use as the second optically anisotropic layer and the first optically anisotropic layer mounted thereon. The alignment layer functions to align the liquid crystal compound for use in accordance with the invention to a given direction. Therefore, the alignment layer preferably exists in producing the optical compensatory film of the invention. However, the alignment layer is not essential as a constitutive element of the optical compensatory film because once the liquid crystal compound is aligned and the aligned state is fixed, the alignment layer already plays the role. In other words, only an optically anisotropic layer in the fixed aligned state may satisfactorily be separated from the alignment layer and transferred to the second optically anisotropic layer such as cellulose acylate film to prepare the optical compensatory film.

(3-1) Alignment Layer

The alignment layer has a function to define the direction of aligning the liquid crystal compound. The alignment layer may be arranged by rubbing treatments of organic compounds (preferably polymers), oblique vapor deposition of inorganic compounds, formation of layers with microgrooves, or accumulation of organic compounds (for example, ω-tricosanoic acid, dioctadecylmethylammonium chloride, methyl slearate) by the Langmuir-Blodgett's method. Furthermore, it is known that an alignment layer getting an alignment function via the load of an electric field and a magnetic field or via light irradiation. Preferably, the alignment layer is formed by the rubbing treatment of polymers.

The alignment layer is preferably formed by the polymer rubbing treatment. Polyvinyl alcohol is a preferable polymer. Modified polyvinyl alcohol bonded with a hydrophobic group is particularly preferable.

The alignment layer may be formed from one polymer type. However, the alignment layer is more preferably formed by the rubbing treatment of a layer comprising two types of crosslinked polymers. As at least one polymer type, any of polymers crosslinking together by themselves or crosslinkable with crosslinking agents may preferably be used. The alignment layer can be prepared by reacting together polymers with functional groups or polymers with functional groups introduced therein, optically, thermally or through pH Change, otherwise, the alignment layer may also be formed by introducing a crosslinking agent-derived binding group between polymers, using a crosslinking agent at high reactivity to crosslink the polymers.

Such crosslinking can be facilitated by coating a coating solution for the alignment layer on the cellulose acylate film followed by heating, where the coating solution contains the polymers as described above or a mixture of the polymers and a crosslinking agent. Since it is just needed that the final product (optical compensatory film) can surely get durability, the crosslinking may satisfactorily be done at any stage from the coating and arrangement of the alignment layer on the cellulose acylate film to the recovery of the optical compensatory film.

Taking account of the aligning performance of the layer (optically anisotropic layer) comprising a liquid crystal compound as formed on the alignment layer, the liquid crystal compound may satisfactorily be aligned and then sufficiently crosslinked, preferably.

Generally, the alignment layer is crosslinked by coating a coating solution for the alignment layer on the cellulose acylate film and then heating and drying the coating solution. By setting the heating temperature of the coating solution at a low temperature, preferably, the alignment layer is sufficiently crosslinked at the stage of the heating process during the formation of the optically anisotropic layer as described below.

As the polymer for the alignment layer, any of polymers which can be crosslinked together by themselves or polymers which can be crosslinked with a crosslinking agent may be used. It is needless to say that polymers crosslinkable in both of the aforementioned fashions exist. The polymers include for example polymers such as polymethylmethacrylate, acrylic acid/methacrylic acid copolymers, styrene/maleimide copolymers, polyvinyl alcohol and modified polyvinyl alcohol, poly(N-methylol acrylamide), styrene/vinyl toluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, carboxymethylcellulose, polyethylene, polypropylene and polycarbonate, and compounds such as silane coupling agents.

The polymers preferably include for example water-soluble polymers such as poly(N-methylol acrylamide), carboxymethylcellulose, gelatin, polyvinyl alcohol and modified polyvinyl alcohol. Gelatin, polyvinyl alcohol and modified polyvinyl alcohol are preferably used. More preferably, polyvinyl alcohol and modified polyvinyl alcohol are used.

Most preferably, two polyvinyl alcohol types or two modified polyvinyl alcohol types with different polymerization degrees are used.

The polyvinyl alcohol includes for example polyvinyl alcohols with a saponification degree within a range of 70 to 100%. Generally, the saponification degree is within a range of 80 to 100%, more preferably 85 to 95%. Additionally, the polymerization degree of the polyvinyl alcohol is preferably within a range of 100 to 3,000.

The modified polyvinyl alcohol includes for example polyvinyl alcohol modified with copolymerization, chain transfer or block polymerization. The modifying group for the modification with copolymerization includes for example COONa, $Si(OX)_3$, $N(CH_3)_3 \cdot Cl$, $C_9$, $H_{19}COO$, $SO_3$, Na, and $C_{12}H_{25}$. The modifying group for the modification with chain transfer includes for example COONa, SH, and $C_{12}H_{25}$. The modifying group for the modification with block polymerization includes for example COOH, $CONH_2$, COOR and $C_6H_5$.

Among them, unmodified or modified polyvinyl alcohol within a saponification degree of 80 to 100% is preferable. More preferred is unmodified or modified polyvinyl alcohol within a saponification degree of 85 to 95%.

As the modified polyvinyl alcohol, preferably, polyvinyl alcohol modified with a compound represented by the following formula is used. The modified polyvinyl alcohol is described below as specified polyvinyl alcohol.

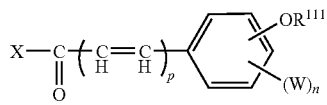

In the formula, $R^{111}$ represents alkyl group, acryloylalkyl group, methacryloylalkyl group, or epoxyalkyl group; W represents halogen atoms, alkyl group or alkoxyl group; X represents an atom group required for forming active ester, acid anhydride or acid halide; p represents 0 or 1; and n represents an integer of 0 to 4.

The specified modified polyvinyl alcohol is preferably polyvinyl alcohol modified with a compound represented by the following formula.

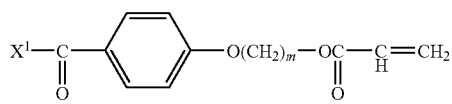

In the formula, $X^1$ represents an atom group required for forming active ester, acid anhydride or acid halide; and m represents an integer of 2 to 24.

As the polyvinyl alcohol for use in the reaction with the compounds represented by these formulae, unmodified polyvinyl alcohol or modified polyvinyl alcohol such as polyvinyl alcohol modified with copolymerization, chain transfer or block polymerization is listed. The specified modified polyvinyl alcohol preferably includes for example those described in detail in the specification of JP-A 9-152509.

The methods for synthetically preparing these polymers, the visible absorption spectrometry and the methods for determining the ratio of such modifying groups introduced therein are described in detail in the publication of JP-A 8-33893.

The crosslinking agent includes for example aldehydes, N-methylol compounds, dioxane derivatives, compounds exerting the reactivity via the activation of the carboxyl group, reactive vinyl compounds, reactive halogen compounds, isoxazoles and dialdehyde starch. The aldehydes include for example formaldehyde, glyoxazole, and glutaraldehyde. The N-methylol compounds include for example dimethylol urea and methylol dimethylhydantoin. The dioxane derivatives include for example 2,3-dihydroxydioxane. The compounds exerting the reactivity via the activation of the carboxyl group include for example carbenium, 2-naphthalene sulfonate, 1,1-bispyrrolidino-1-chloropyridinium, and 1-morpholinocarbonyl-3-(sulfonate aminomethyl). The reactive vinyl compound includes for example 1,3,5-triacryloyl-hexahydro-s-triazine, bis(vinylsulfone)methane, and N,N'-methylenebis-[β-(vinylsulfonyl)propionamide]. The reactive halogen compound includes for example 2,4-dichloro-6-hydroxy-S-triazine. These may be used singly or in combination. These may be used singly or in combination.

These may preferably be used in combination with the water-soluble polymers, particularly the polyvinyl alcohol and the modified polyvinyl alcohol (including the specified modified polyvinyl alcohol described above). In view of productivity, aldehydes with high reactivity, particularly glutaraldehyde is preferably used.

The moisture resistance is likely higher when a larger amount of the crosslinking agent is added. In case that the crosslinking agent is added at an amount of less than 50% by mass of the polymers, preferably, the aligning performance of the alignment layer is never deteriorated. Hence, the crosslinking agent is added at an amount within a range of preferably 0.1 to 20% by mass, more preferably 0.5 to 15% by mass of the polymers. Even after the termination of the crosslinking reaction, the alignment layer contains a certain level of the crosslinking agent unreactive. The amount of the remaining crosslinking agent is preferably at 1.0% by mass or less, more preferably 0.5% by mass or less in the alignment layer. When the unreactive crosslinking agent is contained at 1.0% by mass or less in the alignment layer, preferably, the durability is sufficiently obtained. In case that the alignment layer is used in a liquid crystal display device, specifically, reticulation may sometimes occur after long-term use or when the liquid crystal display device is left to stand alone in atmosphere at high temperature and high humidity.

(3-2) Formation of Alignment Layer

The alignment layer can be formed by coating a solution containing the polymers or a solution containing the polymers and the crosslinking agent on a cellulose acylate film, heating and drying (for crosslinking) the solution and then carrying out a rubbing process. The crosslinking reaction may be done in any timing after the coating of the coating solution on the cellulose acylate film.

In case that a water-soluble polymer such as polyvinyl alcohol is used as a material for forming the alignment layer, then, the solvent for preparing the coating solution may preferably be an organic solvent with a defoaming action such as methanol or a mix solvent of an organic solvent and water. In case that methanol is used as the organic solvent, the ratio in mass of water and methanol is generally 0:100 to 99:1, preferably 0:100 to 91.9. Owing to such ratio, the occurrence of foaming can be suppressed while defects in the alignment layer and additionally on the surface of the optically anisotropic layer can significantly be reduced.

The coating method includes the spin-coating process, the dip-coating process, the curtain-coating process, the extrusion-coating process, the bar-coating process and the E-type coating process. Among them, the E-type coating process is particularly preferable.

The film thickness of the alignment layer is preferably within a range of 0.1 to 10 μm. For the heating and drying, a heating temperature within a range of 20 to 110° C. is preferable For sufficiently forming the crosslinking, the heating temperature is within a range of preferably 60 to 100° C., more preferably 80 to 100° C. The drying time is within a range of preferably one minute to 36 hours, more preferably 5 to 30 minutes The pH is preferably set to the optimal value for the crosslinking agent to be used. In case that glutaraldehyde is used, the pH is preferably within a range of preferably pH 4.5 to 5.5, more preferably at pH 5.

For the rubbing method, the rubbing process widely utilized in the liquid crystal alignment treatment step of LCD is applicable. The characteristic features of the first optically anisotropic layer and the method for producing the same are described hereinbelow.

(4) First Optically Anisotropic Layer
(4-1) Characteristic Features of the First Optically Anisotropic Layer In the first optically anisotropic layer composing the optical compensatory film of the invention, characteristically, Re(550) is 20 to 100 nm with no direction along which retardation at the wavelength of 550 nm is zero nm, and the direction along which the absolute value of retardation at the wavelength of 550 nm reaches minimum never lies along the layer normal direction or on the in-plane. One example of the optically anisotropic layer with such characteristic features is an optically anisotropic layer formed by fixing a liquid crystal composition at a hybrid aligned state. In particular, the first optically anisotropic layer is preferably an optically anisotropic layer prepared by forming the alignment layer on the second optically anisotropic layer, then treating the alignment process, and fixing a discotic liquid crystal compound at a hybrid aligned state. The Re(550) of the first optically anisotropic layer is preferably 20 to 40 nm.

When the Re(550) of the first optically anisotropic layer is less than 20 nm, the optical compensation potency achieved by the optically anisotropic films of the same constitutions as conventional ones is lost. When the Re(550) is 100 nm or less or when no direction along which retardation at the wavelength of 550 nm is zero nm exists or when no direction along which the absolute value of retardation at the wavelength of 550 nm is minimum exists along the layer normal direction Or on the in-plane, preferably, the cell liquid crystallinity in the hybrid alignment can be compensated so that the contrast viewing angle and the color tint can be improved.

The liquid crystal compound for use for forming the first optically anisotropic layer is preferably a liquid crystal compound capable of forming the nematic phase and the smectic phase Generally, liquid crystal compounds are grouped in rod-shaped liquid crystal compounds and discotic liquid crystal compounds. In accordance with the invention, a liquid crystal compound in any shape may satisfactorily be used.

(4-2) Material for use in the First Optically Anisotropic Layer
(4-2-1) Discotic Liquid Crystal Compound The discotic liquid crystal compound for use in forming the first optically anisotropic layer is preferably a compound represented by the formula (D1) described in detail in the specification of JP-A 2006-76992, the column [0012] and thereafter. Specifically, compounds described in the specification of JP-A 2006-76992, the column [0052] and the specification of JP-A 2007-2220, the columns [0040] to [0063] are suitable as the compound. These have high birefringence performance, advantageously. Among compounds represented by the formula (D1), compounds with discotic liquid crystallinity are preferable. Particularly, compounds with discotic nematic phase are preferable.

The disrotic liquid crystal compound preferably includes for example compounds described in JP-A 2005-301206.
(4-2-2) Rod-Shaped Liquid Crystal Compound As the first optically anisotropic layer, rod-shaped liquid crystal compounds may also be used.

So as to satisfy the characteristic features required toward the first optically anisotropic layer when the rod-shaped liquid crystal compound is used, two or more rod-shaped liquid crystal compounds may preferably be used. A preferable combination thereof is a combination of at least one rod-shaped liquid crystal compound represented by the following formula (VIII) and at least one rod-shaped liquid crystal compound represented by the following formula (IX).

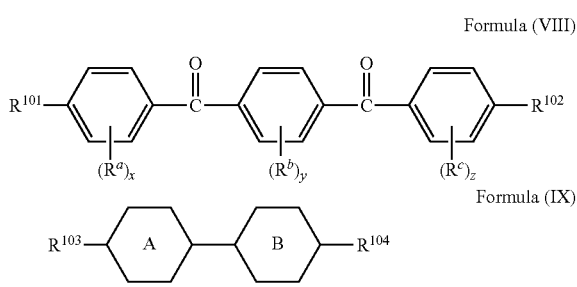

Formula (VIII)

Formula (IX)

In the formulae, A and B independently represent aromatic or aliphatic hydrocarbons or heterocyclic group; $R^{101}$ to $R^{104}$ independently represent substituted or unsubstituted, C1 to C12 (preferably C3 to C7) alkylene groups, or alkoxyl group containing C1 to C12 (preferably C3 to C7) alkylene chain, acyloxy group, alkoxycarbonyl group or alkoxycarbonyloxy group; $R^a$, $R^b$ and $R^c$ independently represent substituents; x, y and z independently represent an integer of 1 to 4.

In the formulae, the alkyl Chain contained in $R^{101}$ to $R^{104}$ may satisfactorily be any of linear chains or branched chains. The alkyl chain is preferably a linear chain. So as to cure the composition, preferably, $R^{101}$ to $R^{104}$ have a polymerizable group at one of the ends. The polymerizable group includes for example acryloyl group, methacryloyl group and epoxy group.

In the formula (VIII), preferably, x and z are 0 while y is 1. One of $R^b$'s is preferably a substituent at m- or o-position toward the oxycarbonyl group or acyloxy group. $R^b$ is preferably for example $C^1$ to $C^{12}$ alkyl group (for example, methyl group), and a halogen atom (for example, fluorine atom).

In the formula (IX), A and B are independently phenylene group or cyclohexylene group, preferably. Preferably, both of A and B are phenylene group. Otherwise, preferably, one of A and B is cyclohexylene group and the remaining group is phenylene group.

(4-3) Method for Forming the First Optically Anisotropic Layer

The first optically anisotropic layer is preferably formed by arranging a composition containing at least one liquid crystal compound type on the surface of a polymer film for use as the second optically anisotropic layer to align the molecules of the liquid crystal compound at a desired alignment state, curing the liquid crystal composition via polymerization to fix the alignment state. So as to satisfy the characteristic features required for the first optically anisotropic layer such that no direction along which retardation at the wavelength of 550 nm is zero nm exists and the direction along which the absolute value of retardation at the wavelength of 550 nm reaches minimum never exists along the layer normal direction or on the in-plane, preferably, the molecules (including both the rod-shaped and discotic molecules) of the liquid crystal compound is fixed at the hybrid alignment state. The term "hybrid alignment" means the alignment state where the director of the liquid crystal molecules continuously changes along the layer thickness direction In case of rod-shaped molecules, the director is along the longitudinal direction. In case of discotic molecules, the director is along the normal direction of the disc plane.

So as to arrange the molecules of the liquid crystal compound at a desired alignment state, and so as to improve the coatability or curability of the composition, the composition may contain one or two or more additives.

So as to put the molecules of a liquid crystal compound (a rod-shaped liquid crystal compound, in particular) in the hybrid alignment, an additive capable of controlling the alignment toward the atmospheric interface of the layer (referred to as "alignment controller toward atmospheric interface" hereinbelow) may be added. The additive includes for example low molecular- or high molecular compounds with hydrophilic groups such as fluoroalkyl groups and sulfonyl groups. The potential alignment controller toward atmospheric interface specifically includes for example compounds described in JP-A 2006-267171.

In case of preparing the composition as a coating solution and then forming the first optically anisotropic layer via coating, furthermore, surfactants may be added so as to improve the coatability. The surfactants preferably include fluorine-series compounds and specifically include compounds described in the specification of JP-A 2001-330725, the columns [0028] to [0056]. Additionally, commercially available "MegaFac F780" (manufactured by DIC) may satisfactorily be used.

Additionally, the composition preferably contains a polymerization initiator. The polymerization initiator may satisfactorily be a thermal polymerization initiator or a photo-polymerization initiator. From the standpoint of for example easy control, a photo-polymerization initiator is preferable. The photo-polymerization initiator generating radicals via light actions preferably includes for example α-carbonyl compounds (described in the specifications of U.S. Pat. Nos. 2,367,661 and 2,367,670), acyloin ether (described in the specifications of U.S. Pat. No. 2,448,828), α-hydrocarbon-substituted aromatic acyloin compounds (described in the specification of U.S. Pat. No. 2,722,512), polynuclear quinine compounds (described in the specifications of U.S. Pat. Nos. 3,046,127 and 2,951,758), combinations of triarylimidazole dimer and p-aminophenylketone (described in the specification of U.S. Pat. No. 3,549,367), acridine and phenazine compounds (described in the specifications of JP-A 60-105667, U.S. Pat. No. 4,239,850), oxadiazole compound (described in the specification of U.S. Pat. No. 4,212,970), acetophenone compounds, benzoin ether-series compounds, benzyl-series compounds, benzophenone-series compounds, and thioxanthone-series compounds. The acetophenone-series compounds include for example 2,2-diethoxyacetophenone, 2-hydroxymethyl-1-phenylpropan-1-one, 4'-isopropyl-2-hydroxy-2-methylpropiophenone, 2-hydroxy-2-methyl-propiophenone, p-dimethylaminoacetone, p-tert-butyldichloroacetophenone, p-tert-butyltrichloroacetophenone, and p-azidebenzal acetophenone. The benzyl-series compounds include for example benzyl, benzyldimethylketal, benzyl-B-methoxyethyl acetal, and 1-hydroxycyclohexylphenyl ketone. The benzoin ether compounds include for example benzoin, benzoin methyl ether, benzoin ethyl ether, benzoin n-propyl ether, benzoin isopropyl ether, benzoin n-butyl ether, and benzoin isobutyl ether. The benzophenone-series compounds include for example benzophenone, methyl o-benzoylbenzoate, Micheler's ketone, 4,4'-bisdiethylaminobenzophenone, and 4,4'-dichlorobenzophenone. The thioxanthone-series compounds include for example thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Among photosensitive radical polymerization initiators comprising such aromatic ketones, acetophenone-series compounds and benzyl-series compounds are particularly preferable in terms of the curing properties, the storage stability, the odor and the like. As the photosensitive radical polymerization initiators comprising such aromatic ketones, one or two or more types thereof may be blended and used, depending on the desired properties.

For the purpose of enhancing the sensitivity, enhancers may be used in addition to the polymerization initiators. The enhancers include for example n-butylamine, triethylamine, tri-n-butylphosphin, and thioxanthone.

Plural types of such photo-polymerization initiator may be used in combination at an amount of 0.01 to 20% by mass, preferably 0.5 to 5% by mass of solids in the croating solution. For light irradiation for polymerizing the liquid crystal compound, ultraviolet ray is preferably used.

Other than the polymerizable liquid crystal compound, the compound may contain a polymerizable monomer with no liquid crystallinity. The polymerizable monomer preferably includes for example compounds with vinyl group, vinyloxy group, acryloyl group or methacryloyl group. The use of polyfunctional monomers with two or more polymerizable, reactive functional groups, for example ethylene oxide-modified trimethylol propane acrylate, improves the durability, preferably.

Because the polymerizable monomer with no liquid crystallinity is a non-liquid crystal component, the polymerizable monomer is added at an amount never exceeding 15% by mass of the liquid crystal compound and is added at an amount of preferably about 0 to 10% by mass thereof.

The first optically anisotropic layer can be formed by preparing the composition as a coating solution, coating the coating solution for example on the surface of the alignment layer formed on the second optically anisotropic layer functioning as a support, drying the solution for removing the solvent and simultaneously align the molecules of the liquid crystal compound, and thereafter curing the molecules via polymerization. The alignment layer applicable includes for example polyvinyl alcohol film and polyimide film.

The coating method includes for example known coating processes such as curtain-coating process, dip-coating process, spin-coating process, printing-coating process, spray-coating process, slot coating process, roll coating process, slide-coating process, blade coating process, gravure coating process, and wire bar process.

For drying the coated film, heating may be done. Simultaneously with the drying of the coated film to remove the solvent, the molecules of the liquid crystal compound in the coated film are aligned to a desired alignment state.

By facilitating the polymerization via ultraviolet irradiation and the like, the alignment state is fixed to form the first optically anisotropic layer. For light irradiation for the polymerization, ultraviolet ray is preferably used. The irradiation energy is preferably 20 mJ/cm$^2$ to 50 J/cm$^2$, more preferably 100 mJ/cm$^2$ to 800 mJ/cm$^2$. So as to promote the photopolymerization, the light irradiation may satisfactorily be carried out under heating conditions.

The first optically anisotropic layer is of any thickness without specific limitation but is of a thickness of preferably 0.1 to 10 μl, more preferably 0.5 to 5 μm.

[Polarizing Plate]
(1) Characteristic Features of Polarizing Plate

The invention relates to a polarizing plate comprising at least the optical compensatory film of the invention and a polarizing film. In integrating the polarizing plate of the invention in a liquid crystal display device, preferably, the optical compensatory film of the invention is arranged on the side of the liquid crystal cell. Additionally, the surface of the second optically anisotropic layer and the surface of the polarizing film are preferably attached together. The cross angle between the in-plane slow axis of the optical compensatory film and the in-plane transmission axis of the polarizing film is approximately zero. However, the angle is not accurately zero in the strict sense, so the error of about ±5 degrees acceptable from the manufacture standpoint is also acceptable with no influence on the advantages of the invention. On the other side of the polarizing film, additionally, a protective film such as cellulose acylate film is preferably attached.

FIG. 2 shows a schematic cross sectional view of one embodiment of the polarizing plate of the invention. The polarizing plate 15 shown in FIG. 2 comprises a polarizing film 13, and the optical compensatory film 10 of the invention and a protective film 14, both of which protect the polarizing plate 13. The second optically anisotropic layer 12 of the optical compensatory film 10 comprises a polymer film, where the back face thereof, namely the surface thereof with no formed first optically anisotropic layer is attached to the surface of the polarizing film 13. In integrating the polarizing plate 15 in a liquid crystal display device, the optical compensatory film 10 is arranged on the side of the liquid crystal cell. Not shown in the figure, the polarizing plate 15 in FIG. 2 may have other functional layers, including for example a diffusion layer and an anti-glare layer on the outer side of the protective film 14.

Members composing the polarizing plate of the invention excluding the optical compensatory film are described below, together with various materials to be used in their preparations.

(2) Other Members Composing the Polarizing Plate
(2-1) Polarizing Film

The polarizing film includes iodine-series polarizing films, dye-series polarizing films with dichromatic dyes, and polyene-series polarizing films. Any one of such polarizing films may be used as the polarizing film of the invention. Using polyvinyl alcohol-series films, generally, iodine-series polarizing films and dye-series polarizing films are produced, (2-2) Protective Film As the protective film attached on the other surface of the polarizing film, a transparent polymer film is preferably used. The term "transparency" means that the transmission ratio of light is 80 or more. As the protective film, preferred are cellulose acylate films, and polyolefin films containing polyolefin. Among the cellulose acylate films, cellulose triacetate film is preferable. Among the polyolefin films, polynorbornene film containing cyclic polyolefin is preferable.

The thickness of the protective film is preferably 20 to 500 µm, more preferably 50 to 200 µm (2-3) Photo-Diffusion Film The polarizing plate of the invention may comprise a photo-diffusion film on one surface of the polarizing film. The photo-diffusion film may satisfactorily be a single-layer film or a multi-layer film. The multi-layer film includes for example a photo-diffusion film with a light scattering layer on a photo-transmissible polymer film. The photo-diffusion film makes contributions to the improvement of the viewing angle when the viewing angle is tilted along the up-down direction or along the right-left direction. A particularly high effect can be exerted in an embodiment of the photo-diffusion film where a reflection-preventive layer is arranged on the outer side of the polarizing film on the side of the display surface. The photo-diffusion film (or the light scattering layer thereof) can be formed from a composition of particles dispersed in a binder. The particles may be inorganic particles or organic particles. Preferably, the difference in refractive index between the binder and the particles is about 0.02 to 0.20. Additionally, the photo-diffusion film (or the light scattering layer thereof) may also have a hard coat function. The photo-diffusion film applicable in accordance with the invention is described in for example JP-A 11-38208 specifying the light scattering coefficient, JP-A 2000-199809 defining the relative refractive index between a transparent resin and particles within a specified range, and JP-A 2002-107512 defining the haze value to 40% or more.

(3) Method for Preparing Polarizing Plate

The polarizing plate of the invention may be produced in the form of a longitudinal polarizing plate. Using for example a polymer film as the second optically anisotropic layer, coating a coating solution for forming an alignment layer if desired to form the alignment layer on the surface, continuously coating and drying a coating solution for forming the first optically anisotropic layer to prepare a desired alignment state, and thereafter performing light irradiation to fix the alignment state to form the first optically anisotropic layer, a longitudinal optical film of the invention is prepared and rolled up in a roll shape. Alternatively, the longitudinal polarizing film and a longitudinal polymer film rolled up in a roll shape for use as the protective film are attached together in a roll-to-roll fashion, resulting in the production of a longitudinal polarizing plate. The longitudinal polarizing plate is for example transferred and stored at the state thereof rolled up in a roll shape; in integrating the polarizing plate in a liquid crystal display device, the roll is cut into a given size. The polarizing plate of the invention may be in another shape other than the longitudinal shape. The method described herein is just one example.

In preparing the film for use as the second optically anisotropic layer, preferably, the film is drawn along the film transfer direction to enable the roll-to-roll treatment during the preparation of the polarizing plate because the process can be simplified and because the precision of the attachment to the axis of the polarizing film can be improved.

[Liquid Crystal Display Device]

The optical compensatory film of the invention and the polarizing plate can be used in various modes of liquid crystal display devices. Furthermore, the optical compensatory film of the invention and the polarizing plate may also be used in liquid crystal display devices of any of the transmission type, the reflection type and the semi-transmission type. The optical compensatory film of the invention and the polarizing plate are effective for a liquid crystal display device comprising a pair of substrates which are arranged in a manner such that the substrates face to each other and at least one of which has an electrode, and a nematic liquid crystal material held between the pair of substrates, where the liquid crystal molecules of the nematic liquid crystal material are aligned approximately perpendicular to the surface of the substrates, in particular a liquid crystal display device of the twisted nematic (TN) mode.

In case that the optical compensatory film of the invention and the polarizing plate are used for the liquid crystal display device of the TN mode, preferably, two sheets of the optical compensatory film of the invention are arranged in symmetry around the center of the liquid crystal cell Additionally, two plates of the polarizing plate of the invention are preferably arranged as the upper and lower plates (on the side of visual observation and on the side of the back light) in a symmetric relation around the center of the liquid crystal cell. The product Δn·d of the liquid crystal layer of the TN-mode liquid crystal cell is generally about 0.1 to 1.5 μm, where the thickness is represented by d (in micron) and the anisotropy of the refractive index is represented by Δn.

FIG. 3 shows a schematic cross sectional view of one embodiment of the liquid crystal display device of the invention. The liquid crystal display device shown in FIG. 3 comprises a TN-mode liquid crystal cell 16 and two plates of the polarizing plate 15 of the invention as arranged symmetrically to each other to interpose the TN-mode liquid crystal cell 16 between the plates. The liquid crystal cell 16 comprises a liquid crystal layer comprising a nematic liquid crystal material, where the liquid crystal layer is put at a twisted alignment state under no load of any driving voltage and is put at an alignment state perpendicular to the substrate plane during loads of a driving voltage. Since the upper and lower polarizing plates 15, 15 are arranged so that the transmission axes of the individual polarizing films 13 might be perpendicular to each other, linear polarized light incident through the liquid crystal cell 16 from the back light (not shown in the figure) arranged at the back of the lower polarizing plate 15 rotates by 90° along the twisted alignment of the liquid crystal layer and then transmits through the transmission axis of the upper polarizing plate 15, resulting in white display. During loads of the driving voltage, alternatively, linear polarized light incident through the liquid crystal cell passes through the cell while the light remains at the polarized state, so that the light is blocked with the upper polarizing plate 15, resulting in black display. The optical compensatory film 10 of the invention as arranged above and below the liquid crystal cell 16 compensates birefringence emerging along the oblique direction during black display and concurrently makes contributions to the reduction of yellowish tint emerging along the oblique lateral direction during half tone display.

Figure 4:
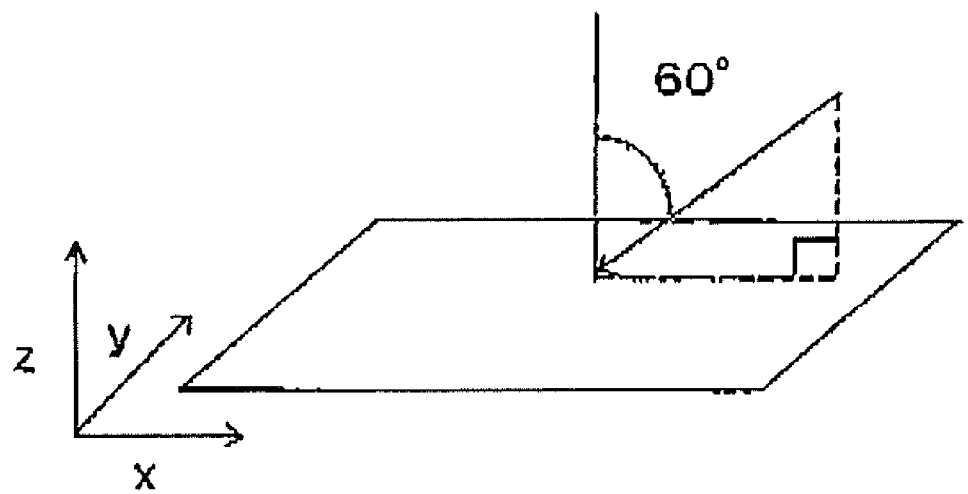
FIG. 4 is a view to be used in describing the method for measuring the yellowish tint along the oblique lateral direction during half tone display on the liquid crystal display device.

The TN-mode liquid crystal display device with the optical compensatory film of the invention characteristically has a wide viewing angle at a low level of the yellowish tint along the oblique lateral direction during half tone display. Specifically, the TN-mode liquid crystal display device of the invention can achieve a viewing angle of 320° or larger which realizes the contrast of 10 or more (as the total of viewing angles along the upper and lower directions and the right and left directions on image). As shown in FIG. 4, furthermore, the liquid crystal display device can achieve the variation of yellowish tint (Δv') satisfying 0.03 or less where the normal direction on the image display plane (xy plane) is defined as polar angle 0° and where y=0 is used as the axis, when the image display plane is tilted from the polar angle of 0° to 60° toward the side of the display plane.

(Liquid Crystal Display Device in one Preferable Embodiment of the Invention)

The liquid crystal display device of the invention is the TN-mode liquid crystal display device equipped with a liquid crystal cell and a polarizing plate arranged on at least one side of the liquid crystal cell, where the liquid crystal Cell comprises color filters of red, green and blue and liquid crystal layers individually corresponding to the red, green and blue color filters, where the liquid crystal layers are of a multi-gap structure satisfying the relation dR≧dG>dB or dR>dG≧dB and where the polarizing plate comprises a polarizing film and the optical compensatory film of the invention as arranged on the polarizing film on the side of the liquid crystal cell. Such constitution can additionally reduce yellowish tint occurring along the oblique lateral direction during half tone display and can further suppress whitish change emerging along the same direction. The embodiment of the liquid crystal display device of the invention, using the liquid crystal cell of such multi-gap structure is sometimes referred to as "preferable embodiment of the liquid crystal display device of the invention" hereinafter.

In a preferred liquid crystal display device of the invention, polarizing plates are preferably placed on both sides of the liquid crystal cell, and the polarizing plates wherein the optically compensatory film of the invention is used as a protective layer are preferably placed on both sides of the liquid crystal cell.

In the preferable embodiment of the liquid crystal display device of the invention, the liquid crystal layers are of a multi-gap structure so the value of phase difference varies depending on the thickness of the liquid crystal layer corresponding to the color filter of each of the colors. The liquid crystal layers in their entirety can get a characteristic profile that the value of phase difference is larger as the wavelength is longer, namely so-called inverse wavelength dispersion profile.

A combination of such liquid crystal layers exerting the characteristic inverse dispersion profile and the optical compensatory film of the invention makes equal the intensity of light projected toward the side of visual observation despite the wavelength, so that the yellowish tint occurring during the oblique lateral direction during half tone display can further be reduced while the whitish change emerging along the same direction can also be suppressed Details of constitutive members of the preferable embodiment of the liquid crystal display device of the invention are described below. However, the invention is never limited to the following specified mode alone.

The liquid crystal cell comprises color filters of red, green and blue and liquid crystal layers individually corresponding to the color filters of red, green and blue. Preferably, the liquid crystal layers are placed and held between a first substrate and a second substrate. Preferably, the color filters are formed on the first substrate. On the second substrate, preferably, there are arranged a TFT device controlling the electro-optical properties of liquid crystal, a scanning wire giving gate signals to the active device and a signal wire giving source signals.

In the preferable embodiment of the liquid crystal display device of the invention, the color filters may satisfactorily be arranged on any side of the first substrate or the second substrate.

The color filters for use in the preferable embodiment of the liquid crystal display device of the invention are any appropriate color filters with three primary colors of red, green and blue. The color filters may additionally comprise a filter of another color such as deep red. It is preferred that the red filter is at the maximum transmission ratio within a range of 400 nm to 480 nm; the green filter is at the maximum transmission ratio within a range of 520 nm to 580 nm; and the blue filter is at the maximum transmission ratio within a range of 590 nm to 780 nm. The maximum value of the transmission ratio of each of the colors is preferably 80% or more.

The thickness of the color filters is appropriately selected. The thickness thereof is preferably 0.4 to 4.0 μm, more preferably 0.7 to 3.5 μm. For the color filters, an appropriate pixel pattern such as those of stripe type, mosaic type, triangle type and block type may be selected.

On the pixel elements with the color filters formed thereon, there are arranged if necessary a blackmatrix arranged in the interface parts of the individual color filters, a protective layer formed to cover the color filters and a transparent conductive film formed on the protective layer.

As the color material forming the color filters, for example, dyes or pigments are used with no specific limitation. The dye-series filters characteristically have excellent transparency and contrast with enriched spectral variations. The pigment-series color filters have excellent thermal resistance and light resistance. The color filters are produced by methods of for example photolithography, etching, printing, electro-deposition, ink-jetting and vapor deposition.

Preferably, the color material forming the color filters is a pigment. The pigment-series color filters can be obtained from colored resins with pigments dispersed in binder resins such as acryl and polyimide. The pigment includes for example Pigment Red 177 (crimson lake), Pigment Red 168, Pigment Green 7 (phthalocyanine green), Pigment Green 36, Pigment Blue 15 (phthalocyanine blue), Pigment Blue 6, and Pigment Yellow 83 (azo-series yellow) according to the Color Index Generic Nomenclature. So as to adjust the color, plural colors are mixed together for use as the pigment.

The pigment is at a dispersion state with a mean particle size of secondary particles being preferably 0.2 μm or less, more preferably 0.1 μm or less. Herein, the term "second particles" means an aggregate formed by binding together particles (primary particles) of a pigment. Any pigment-series color filter at such dispersion state is at a high transmission ratio with a low deterioration level of polarization.

The liquid crystal layers for use in the preferable embodiment of the liquid crystal display device of the invention are of a multi-gap structure where the thickness corresponding to each color filter satisfies the relation dR≧dG>dB or dR>dG≧dB. Herein, dR, dG and dB individually represent the thickness of the liquid crystal layer corresponding to each of the color filters of red, green and blue. More preferably, the thickness of the liquid crystal layer corresponding to each color filter satisfies dR>dG>dB. When dG>dB even if dR=dG, the leakage of light in the liquid crystal display device in the blue zone with a significant effect can be reduced, therefore resulting in a relatively better display performance. When dR>dG even if dG=dB, similarly, relatively good results can be obtained.

The value of (dR−dG) or (dG−dB) is preferably 0.1 to 1.5 μm, more preferably 0.5 to 1.2 μm. Preferably dR is 2.8 to 7.9 μm; dG is 2.7 to 5.7 μm; and dB is 2.6 to 5.6 μm.

In the liquid crystal display device of the invention, dR and dB preferably satisfy the inequality formula 0 μm<dR−dB≦3.0 μm, so as to further reduce yellowish tint emerging along the oblique lateral direction during half tone display and to additionally suppress whitish change emerging along the same direction.

The multi-gap structure of the liquid crystal layer more preferably satisfies the inequality formula 0.2 μm<dR=dB≦3.0 μm and particularly preferably satisfies the inequality formula 1.0 μm<dR−dB≦2.5 μm.

An appropriate method is used as the method for forming the multi-gap structure. Preferably, the multi-gap structure is formed by modifying the thickness of each of the red, green and blue color filters. The thickness of each of the color filters then is decreasing in the order of blue, green and red among the three primary colors. The thickness of each of the color filters can be raised or reduced by the amount of a colored resin used for coating when for example photolithography or etching is selected. When electro-deposition and vapor deposition are selected, the thickness of each of the color filters can be adjusted by the time period of immersion in an electro-deposition solution or vapor deposition time.

The multi-gap structure can be formed by the other method comprising arranging an undercoat layer on the side of the first substrate for each of the color filters and modifying the thickness of the undercoat layer corresponding to each color. Additionally, another method for forming the multi-gap structure comprises arranging an overcoat layer on the side of the liquid crystal layer of each of the color filters, and modifying the thickness of the overcoat layer corresponding to each of the colors. The overcoat layer then may also function as a protective layer for the color filters.

The thickness of each of the color filters may be the same or different depending on the color. Even in this case, the multi-gap structure can be obtained by appropriately adjusting the thickness of the undercoat layer or the overcoat layer. The liquid crystal cell for use in the preferable embodiment of the liquid crystal display device of the invention may comprise both the undercoat layer and the overcoat layer or may comprise the undercoat layer and/or the overcoat layer on only some of the colors of red, green and blue.

Preferably, the material for forming the undercoat layer and the overcoat layer has high transparency and excellent thermal resistance. Such material includes for example polyimide-series resins and ultraviolet-cured resins such as acryl and epoxy.

The wavelength dispersion property of the liquid crystal layers is preferably an inverse wavelength dispersion property. Because the liquid crystal layers with such property can reduce the light leakage in the blue zone as a cause of the deterioration of the display performance, yellowish tint occurring during half tone display along the oblique lateral direction can be reduced more, while whitish change occurring along the same direction can be suppressed. Such liquid crystal display device can be obtained, advantageously.

When the liquid crystal layer having wavelength dispersion property is used with the optical compensatory film of the invention has a second optically anisotropic layer satisfying the formulae (a) and (b) or a second optically anisotropic layer satisfying the formulae (c) and (d), it is preferable to obtain a liquid crystal display wherein a viewing angle CR property can be improved remarkably, and yellowish tint occurring during half tone display along the oblique lateral direction can be reduced more, while whitish change occurring along the same direction can be suppressed.

The optical compensatory film of the invention having a second optically anisotropic layer satisfying the formulae (a) and (b) and the formulae (c) and (d) is preferably used in combination with the liquid crystal layers exerting such inverse wavelength dispersion property.

<Measurement Process>

Hereinafter, a method for measuring physical properties and optical properties is described.

(1) Re and Rth

In this application, $Re(\lambda)$ and $Rth(\lambda)$ each indicate the in-plane retardation and the thickness-direction retardation of a film at a wavelength λ (unit, nm) $Re(\lambda)$ is determined, using KOBRA 21ADH or WR (by Oji Scientific Instruments), with light having a wavelength of λ nm given to a film in the normal direction thereof.

In the case where the film to be analyzed is a monoaxial or biaxial index ellipsoid, then its $Rth(\lambda)$ may be computed as follows:

$Re(\lambda)$ of the film is determined as follows, with the in-plane slow axis (as judged with KOBRA 21ADH or WR) taken as the tilt angle (rotation angle) (in the case where the film does not have a slow axis, any desired in-plane direction of the film may be taken as the rotation axis). An incident light having a wavelength of λ nm in applied to the film in the direction tilted from the normal direction of the film at regular intervals of 10° steps from the normal direction to 50°, at 6 points in total, and from the found data of the retardation value, the assumed mean refractive index and the film thickness, Rth(λ) is computed by KOBRA 21ADH or WR.

In the above, when no specific description is given to λ and when only Re and Rth are shown, the data are with light having a wavelength of 590 nm. For the film having a tilt angle at which the retardation thereof is zero with the in-plane slow axis from the normal direction taken as the rotation axis, its retardation at a tilt angle larger than that tilt angle is converted into the corresponding negative value and then computed by KOBRA 21ADH or WR.

With the slow axis taken as the tilt axis (rotation axis) (in the case where the film does not have a slow axis, any desired in-plane direction of the film may be taken as the rotation axis), a retardation is determined in any desired two tilt directions, and based on the found data and the assumed mean refractive index and the inputted film thickness, Rth of the film may also be computed according to the following formulae (1) and (2):

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left\{\sin^{-1}\left(\frac{\sin(-\theta)}{nx}\right)\right\}} \quad (1)$$

wherein Re(θ) means a retardation in the direction tilted by an angle θ from the normal direction; nx means the refractive index in the in-plane slow axis direction; ny means the refractive index in the direction perpendicular to the in-plane nx; nz means the refractive index in the direction perpendicular to nx and ny; d means the thickness of the film.

$$Rth = ((nx+ny)/2 - nz) \times d. \quad (2)$$

In the case where the film to be analyzed could not be expressed as a monoaxial or biaxial index ellipsoid, or in the case where the film to be analyzed has no optical axis, then its Rth(λ) may be computed as follows:

Re(λ) of the film is determined as follows, with the in-plane slow axis (as judged with KOBRA 21ADH or WR) taken as the tilt angle (rotation angle). An incident light having a wavelength of λ nm in applied to the film in the direction tilted from the normal direction of the film at regular intervals of 10° steps within a range of from −50° to +50° from the normal direction thereof, at 11 points in total, and from the found data of the retardation value, the mean refractive index and the film thickness, Rth(λ) is computed by KOBRA 21ADH or WR.

In the above measurement, the assumed value of the average refraction index may be obtained from Polymer Handbook (JOHN WILEY & SONS, INC) and catalogs for various optical films. Polymers for which the average refraction index is unknown, the index can be measured with an Abbe refractometer. The average refraction indices of principal optical films are exemplified below: cellulose acylate (1.48), cycloolefin polymer (1.52), polycarbonate (1.59), polymethyl methacrylate (1.49) polystyrene (1.59).

The assumed mean refractive index and the film thickness are inputted therein, and KOBRA 21ADH or WR computes nx, ny and nz. From the computed data nx, ny and nz, Nz is further computed as follows: Nz=(nx−nz)/(nx−ny).

In this application, Re and Rth mean those at the wavelength of 550 nm unless other wavelength is stated. In this application, values and ranges of optical properties are interpreted to include generally-accepted fudge factor in the filed of liquid crystal display devices and elements therefor.

(2) Glass Transition Temperature 20 mg of a film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 250° C., and the temperature at which the base line of the temperature profile of the sample begins to deviate from the low-temperature side is referred to as glass transition temperature (Tg) of the film.

(3) Melting Point 20 mg of a film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the endothermic peak starting temperature detected in the test is the melting point of the film. The melting point is observed in a higher temperature range than the glass transition temperature.

(4) Crystallization Temperature 20 mg of a film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the exothermic peak starting temperature detected in the test is the crystallization temperature of the film. The crystallization temperature is generally observed in a higher temperature range than the glass transition temperature (5) Moisture Permeability A cup with calcium chloride charged therein was covered and sealed with a lid, using a film, which was then measured of the change of the mass [g/(m²·day)] before and after moisture adjustment after the cup was left to stand under conditions of 40° C. and a relative humidity of 90% for 24 hours. The moisture permeability was evaluated on the basis of the change of the mass. Further, moisture permeability increases following the increase of temperature and the increase of humidity. Despite the individual conditions, the moisture permeability never changes dimensionally among films. In accordance with the invention, the value of the change of the mass at 40° C. and a relative humidity of 90% is used as the standard, furthermore, the moisture permeability decreases following the increase of the film thickness but increases as the film thickness decreases. Accordingly, the moisture permeability actually measured is multiplied with the film thickness actually measured, and is then divided by 80. The resulting value is defined as "moisture permeability on an 80-μm film thickness basis".

(6) Substitution Degree

By measuring the binding level of acetic acid and/or a fatty acid with 3 to 22 carbon atoms in substitution with the hydroxyl groups in cellulose, the substitution degree can be calculated. The methods for the measurement are according to ASTM D-817-91.

EXAMPLES

The characteristics of the invention are described more concretely with reference to the following Examples. In the following Examples, the material used, its amount and the ratio, the details of the treatment and the treatment process may be suitably modified or changed. Accordingly, the invention should not be limitatively interpreted by the Examples mentioned below.

Examples 1 through 8

(1) Preparation of Second Optically Anisotropic Layer (1-1) Preparation of Cellulose Acylate Film for use as the Second Optically Anisotropic Layer A cellulose acylate solution A-1 of the following composition which contains a wavelength dispersion adjuster (Compound AB) with the absorption peak at 369 nm was cast with a band caster. By peeling off the resulting film at a residual solvent amount at about 60% from the band and transferring the film with a tenter, and drying the film at 110° C. for 5 minutes and then at 140° C. for 10 minutes, a cellulose acylate film of a cellulose acylate film thickness of 80 μm for use as the second optically anisotropic layer was obtained. The $T_{go}$ of the film for use as the second optically anisotropic layer in Examples 1 to 8 using the cellulose acylate solution A-1 was 137° C.; $T_c$ thereof was 155° C.; and $T_m$ thereof was 282° C. Even in Examples 9 and 10 described below, the temperature properties of the films for use as the second optically anisotropic layer, in Examples 1 to 8 using the cellulose acylate solution A-1, were identical.

Composition of Cellulose Acylate Solution A-1

| | |
|---|---|
| Cellulose acetate of a mean substitution degree of 2.94 | 100.0 parts by mass |
| Methylene chloride (first solvent) | 517.6 parts by mass |
| Methanol (second solvent) | 77.3 parts by mass |
| Silica particle of a mean particle size of 16 nm (AEROSIL R972 manufactured by Aerosil Japan, Co., Ltd.) | 0.13 part by mass |
| Controller of optical anisotropy (the following compound AA) | 11.7 parts by mass |
| Wavelength dispersion adjuster (the following compound AB) | 7.5 parts by mass |
| Citrate ester | 0.01 part by mass |

Compound AA

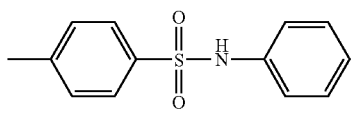

Compound AB

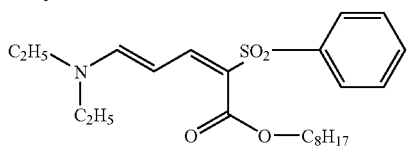

Compound AC

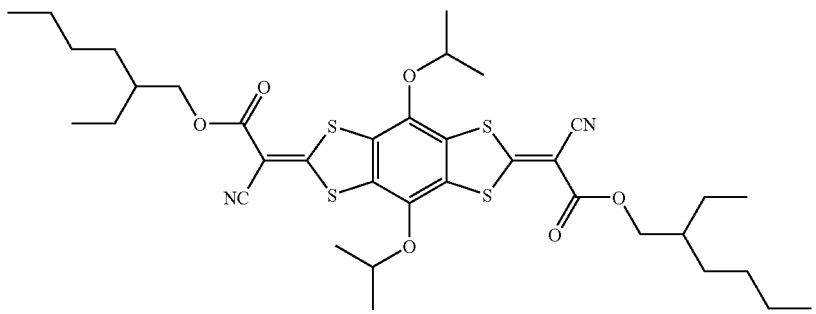

Compound AD

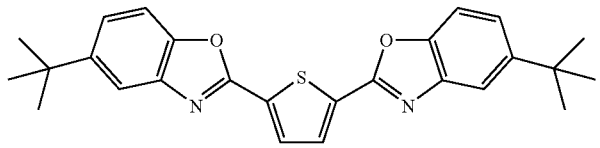

Compound AE

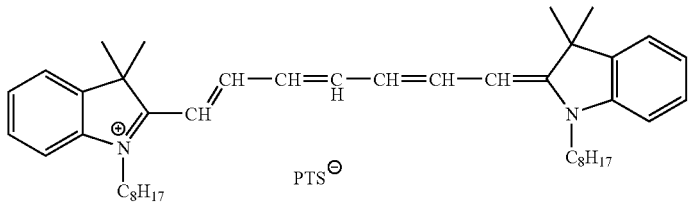

In the structural formula of the compound AE, PTS⁻ represents p-toluenesulfone ion.

(1-2) Drawing Step

Longitudinal uniaxial drawing process with a roll drawer was carried out. The drawing conditions are shown below. As the roll of the roll drawer, an inductive exothermic jacket roll with the surface treated by planishing process was used. The temperature of each roll was adjusted. Drawing ratio was controlled by adjusting the ratio of the peripheral speed of the nip roll downstream and the peripheral speed of the nip roll upstream. The longitudinal/crosswise ratio (the distance between the nip rolls/the width of base inlet) was adjusted to 0.5. The drawing speed was 10%/min of the drawing distance. The drawing ratio was set to 21% while the temperature was set to 150° C.

The drawing ratio (%) of the film was determined by the following formula, after marking a given interval with a marker line along the direction perpendicular to the film transfer direction and measuring the distance of the interval before and after the drawing step. By the same method, the film drawing ratio was determined even in the following Examples and Comparative Examples.

100×[marker line interval after drawing−marker line interval before drawing]/(marker line interval before drawing)

(1-3) Heat Treatment Step

Both the ends of the film along the width direction were held with a tenter clip, for thermally treating the cellulose acylate film, while avoiding the dimensional change along the width direction by controlling the distance between the clip holding one of the ends and the clip holding the other end.

The heating zone was at 200° C. The film was passed through the zone in 10 minutes to obtain the cellulose acylate film.

The cellulose acylate film for use as the second optically anisotropic layer as obtained above was at a thickness of 75 μm and with Re(550) of 80 nm and Rth(550) of 60 nm, and with the following wavelength dispersion property.

$Re(450) - Re(550) = -35$ nm $Rth(450) - Rth(550) = 44$ m (2) Formation of Alignment Layer (2-1) Saponification Process of the Cellulose Acylate Film for use as the Second Optically Anisotropic Layer The cellulose acylate film for use as the second optically anisotropic layer was passed through a dielectric heating roll at a temperature of 60° C., to raise the film surface temperature to 40° C.; subsequently, an alkali solution of the following composition was coated on the film with a bar coater at 14 ml/m²; and the film was retained below a steam-type far infrared heater (manufactured by Noritake Company) heated to 110° C. for 10 seconds; then, pure water was coated at 3 ml/m² with a bar coater, similarly. The film temperature then was 40° C. Subsequently, washing with water with a fountain coater and water draining with an air knife were individually repeated three times; then, the resulting film was retained in a drying zone at 70° C. for 2 seconds for drying the film.

Composition of Alkali Solution for Saponification Process

| | |
|---|---|
| Potassium hydroxide | 4.7 parts by mass |
| Water | 15.7 parts by mass |

-continued

| | |
|---|---|
| Isopropanol | 64.8 parts by mass |
| Propylene glycol | 14.9 parts by mass |
| Surfactant [$C_{16}H_{33}O(CH_2CH_2O)_{10}H$] | 1.0 part by mass |

(2-2) Formation of Alignment Layer

On the saponification-treated surface of the saponified cellulose acylate film for use as the second optically anisotropic layer was coated a coating solution of the following composition for forming the alignment layer at 24 ml/m² with a wire bar coater, for drying in hot air at 100° C. for 120 seconds. The thickness of the alignment layer was 1.0 μm. Subsequently, the film was set to 0° C. along the longitudinal direction (transfer direction) to perform the rubbing process of the formed film along the direction of 0°.

Composition of Coating Solution for Forming Alignment Layer

| | |
|---|---|
| The following modified polyvinyl alcohol | 40 parts by mass |
| Water | 728 parts by mass |
| Methanol | 228 parts by mass |
| Glutaraldehyde (crosslinking agent) | 2 parts by mass |
| Citrate ester (AS3, Sankyo Chemical Co., Ltd.) | 0.69 part by mass |

Modified polyvinyl alcohol

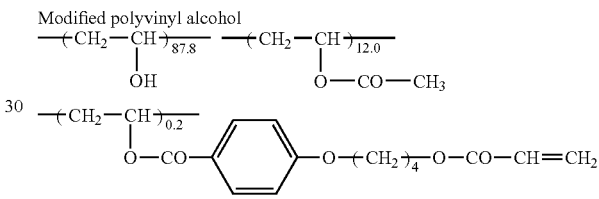

(3) Formation of the First Optically Anisotropic Layer

In Examples 1 to 8, coating solutions I-No. 1 to I-No. 8 of the following compositions for forming the first optically anisotropic layer were individually coated on the rubbing-treated plane of the alignment layer. Subsequently, the coated planes were heated in a thermostat tank at 130° C. for 120 seconds, to align the discotic liquid crystal compounds. Then, irradiation of ultraviolet ray from a high-pressure mercury arc at 160 W/cm was done at 80° C. for 40 seconds to facilitate the crosslinking reactions to polymerize the discotic liquid crystal compounds. Subsequently, the resulting optically anisotropic layers were left to stand for cooling to ambient temperature. The resulting optically anisotropic layers were measured of Re at a wavelength of 550 nm and of the film thickness, as shown in the following table. By measuring retardation values and refractive indexes at 11 points in total, along slanting directions from the film normal direction by 50 degrees on a single side in 10-degree steps via incident light of a wavelength of 550 nm, it was confirmed on the basis of the measured retardation values, the fictive value of mean refractive index and the input film thickness according to COBRA 21ADH or WR that in the first optically anisotropic layers, further, the molecules of the discotic liquid crystal compounds were fixed at hybrid alignment states, where retardation at the wavelength of 550 nm was never zero nm along any direction and where the direction along which the absolute value of retardation at the wavelength of 550 nm reached minimum never existed along the normal direction of the layer or on the in-plane of the layer.

Compositions of Coating Solutions I-No. 1 to I-No. 8 for Forming First Optically Anisotropic Layers

| | | |
|---|---|---|
| Methyl ethyl ketone | 270 | parts by mass |
| First liquid crystal compound shown below in Table 1 | 90 | parts by mass |
| Second liquid crystal compound shown below in Table 1 | 10 | parts by mass |
| Controller of atmospheric interface alignment in the following structure | 1.0 | part by mass |
| Photo-polymerization initiator (Irgacure 907, manufactured by Ciba Specialty Chemicals Corporation) | 3.0 | parts by mass |
| Enhancer (Kayacure DETX manufactured by Nippon Kayaku Co., Ltd.) | 1.0 | part by mass |

Controller of atomospheric interface

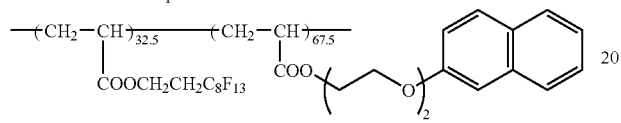

Controller of Atmospheric Interface Alignment

In Examples 1 to 8, individual coating solutions I-No. 1 to I-No. 8 were used for forming the first optically anisotropic layer. The first optically anisotropic layers were formed from combinations of the first liquid crystal compound and the second liquid crystal compound in the coating solutions I-No. 1 to I-No. 8 for forming the first optically anisotropic layers, to prepare the optical compensatory films of Examples 1 to 8. The film thickness was adjusted so that the in-plane retardation value "Re" might be 28 nm. The thickness of each of the layers then was 0.9 μm to 1.2 μm.

TABLE 1

| Coating solution for the first optically anisotropic layer | First liquid crystal compound | Second liquid crystal compound | Thickness (μm) |
|---|---|---|---|
| I-No.1 | Compound (1) | Compound (1) | 1.2 |
| I-No.2 | Compound (2) | Compound (2) | 0.9 |
| I-No.3 | Compound (2) | Compound (1) | 1 |
| I-No.4 | Compound (3) | Compound (1) | 1 |
| I-No.5 | Compound (4) | Compound (1) | 1 |
| I-No.6 | Compound (5) | Compound (1) | 1 |
| I-No.7 | Compound (6) | Compound (1) | 1 |
| I-No.8 | Compound (7) | Compound (1) | 1 |

Compound (1)

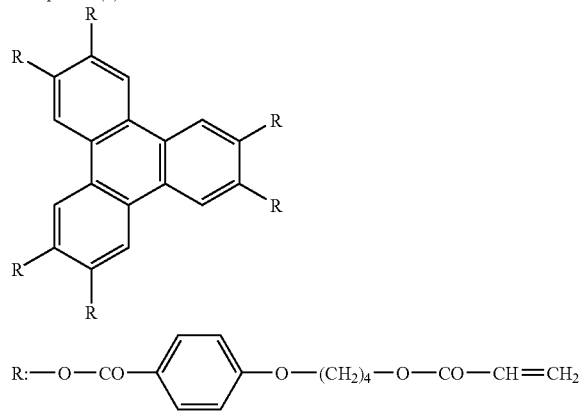

R: —O—CO—⟨phenyl⟩—O—(CH$_2$)$_4$—O—CO—CH=CH$_2$

TABLE 1-continued

| Coating solution for the first optically anisotropic layer | First liquid crystal compound | Second liquid crystal compound | Thickness (μm) |
|---|---|---|---|

Compound (2)

R = [5-methyl-1,3,4-oxadiazol-2-yl connected to fluorinated phenyl-X]

X = —O(CH$_2$)$_2$CH(CH$_3$)OCOCH=CH$_2$

Compound (3)

R = [5-methyl-1,3,4-oxadiazol-2-yl connected to naphthyl-X]

X = —OCOO(CH$_2$CH$_2$O)$_2$COCH=CH$_2$

Compound (4)

R = [5-methyl-1,3,4-oxadiazol-2-yl connected to phenyl-X]

X = —COO(CH$_2$)$_2$OCOCH=CH$_2$

Compound (5)

R = [5-methyl-1,3,4-oxadiazol-2-yl connected to phenyl-X]

X = —COO(CH$_2$)$_5$OCOCH=CH$_2$

TABLE 1-continued

| Coating solution for the first optically anisotropic layer | First liquid crystal compound | Second liquid crystal compound | Thickness (μm) |
|---|---|---|---|
| Compound (6) [structure with R groups on benzene ring; R = oxadiazole-phenyl-X; X = —O(CH$_2$)$_6$OCOCH=CH$_2$] | | | |
| Compound (7) [structure with R groups on benzene ring; R = oxadiazole-phenyl-alkyne-X; X = —(CH$_2$)$_3$OCOCH=CH$_2$] | | | |

(4) preparation of Polarizing Plate

By immersing a polyvinyl alcohol (PVA) film of a thickness of 80 μm in an aqueous iodine solution at an iodine concentration of 0.05% by mass at 30° C. for 60 seconds, the film was soaked; The film was longitudinally drawn to 5 fold the original length while the film was immersed in an aqueous boric acid solution at a boric acid concentration of 4% by mass for 60 seconds, which was then dried at 50° C. for 4 minutes, to obtain a polarizing film of a thickness of 20 μm.

After the exposed face of the prepared optical film on the side of the cellulose acylate film (the surface on the side with no formed first optically anisotropic layer) was immersed in an aqueous 1.5 mol/L sodium hydroxide solution at 55° C., sodium hydroxide was sufficiently rinsed off with water. After the film was subsequently immersed in an aqueous dilute 0.005 mol/L sulfuric acid solution at 35° C. for 1 minute, the aqueous dilute sulfuric acid solution was sufficiently rinsed off by immersion in water, to finally dry the film sufficiently at 120° C.

The optical film treated for saponification as described above was used in combination with a commercially available cellulose acetate film treated for saponification in the same manners for the attachment of the saponification-treated faces thereof with a polyvinyl alcohol-series adhesive so as to interpose the polarizing film between them, so that a polarizing plate with the layer constitution shown in FIG. 2 was obtained. As the commercially available cellulose acetate film, FUJITAC TF80UL (manufactured by FUJIFILM Corporation) was used. Since the polarizing film and the protective film on both the sides of the polarizing film were prepared in the roll shape, the longitudinal directions of each of the roll films were parallel, so these films were continuously bonded together. Therefore, the longitudinal direction of the optical film roll (the casting direction of the film) and the absorption axis of the polarizing film are in a parallel direction.

(5) Preparation of TN-Mode Liquid Crystal Display Device

A TN-mode liquid crystal display device in the same constitution as in FIG. 3 was prepared. Specifically, a pair of polarizing plates arranged in a liquid crystal display device using a TN-mode liquid crystal cell (AL2216W manufactured by Acer Japan Incorporated) were peeled off, instead, each of the polarizing plates prepared above was attached through an adhesive on the side thereof facing viewers and on the side of the back light so that the first optically anisotropic layer might be on the side of the liquid crystal cell. Then, the polarizing plates were arranged so that the transmission axis of the polarizing plate on the side thereof facing viewers might be perpendicular to the transmission axis of the polarizing plate on the side of the back light. In such manner, a TN-mode liquid crystal display device was prepared.

Example 9

In the same manner as in Example 1 except for the modification of the step of forming the alignment layer and the first optically anisotropic layer in Example 1, a TN-mode liquid crystal display device was prepared.

By the same steps as in Example 1, a roll film coated with a coating solution for forming the alignment layer was prepared. The film with the coated alignment layer in the roll state was discharged for the rubbing process of the surface of the alignment layer by rotating the rubbing roller of a rubbing device in an inverse rotation along the transfer direction. Continuously, the rubbing-processed face was dusted off in an ultrasonic fashion. After dusting, a coating solution II of the following composition for forming the first optically anisotropic layer was coated on the rubbing-processed face with a wire bar #2 at a wet coat amount of 3.5 ml/cm$^2$, for drying and aligning at 120° C. for 1.5 minutes, subsequently, UV irradiated the film at an irradiation dose of 200 mJ/cm$^2$ from a metal halide lamp at 120 W/cm, at a state where the film temperature was retained at 80° C., to facilitate the polymerization reaction for fixing the alignment state to form the first optically anisotropic layer, which was then rolled up into a roll film state at a roll-up member. The thickness of the first optically anisotropic layer was 1.4 μm. Only the first optically anisotropic layer of the resulting film was transferred onto a glass plate to measure the optical properties at a wavelength at 550 nm according to KOBRA 21ADH. Consequently, Re(550) was 50 nm. By measuring retardation values and refractive indexes at 11 points in total, along slanting directions from the film normal direction by 50 degrees on a single side in 10-degree steps via incident light of a wavelength of 550 nm, it was confirmed on the basis of the measured retardation values, the fictive value of mean refractive index and the input film thickness according to KOBRA 21ADH or WR that in the first optically anisotropic layer, further, the molecules of the discotic liquid crystal compounds were fixed at hybrid alignment states, where retardation at the wavelength of 550 nm was never zero nm along any direction and where the direction along which the absolute value of retardation at the wavelength of 550 nm reached minimum never existed along the normal direction of the layer or on the in-plane of the layer.

By the same method as in Example 1, a polarizing plate and a TN-mode liquid crystal display device were prepared.

Composition of Coating Solution IT for Forming the First Optically Anisotropic Layer used in Example 9

| | |
|---|---|
| Methyl ethyl ketone | 102.00 parts by mass |
| Discotic liquid crystal compound (the compound (1)) | 41.01 parts by mass |
| Ethylene oxide-modified trimethylol propane acrylate (V360 manufactured by Osaka Organic Chemistry Co., Ltd.) | 4.06 parts by mass |
| Cellulose acetate butylate (CAB531-1 manufactured by Eastman Chemical) | 0.11 part by mass |
| Cellulose acetate butylate (CAB551-0.2 manufactured by Eastman Chemical) | 0.34 part by mass |
| Photo-polymerization initiator (Irgacure 907 manufactured by Ciba Specialty Chemicals Corporation) | 1.35 parts by weight |
| Enhancer (Kayacure-DETX manufactured by Nippon Kayaku Co., Ltd.) | 0.45 part by mass |
| Fluoro-aliphatic group-containing polymer 1 of the following structural formula | 0.23 part by mass |
| Fluoro-aliphatic group-containing polymer 2 of the following structural formula | 0.03 part by mass |

Fluoro-aliphatic group-containing polymer 1
[a/b = 90/10 (ratio in % by mass)]

Fluoro-aliphatic group-containing polymer 2
[a/b = 98/2 (ratio in % by mass)]

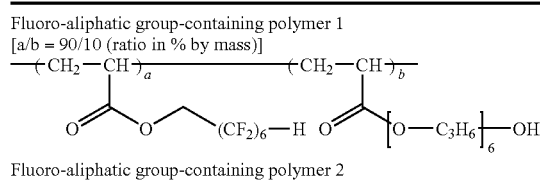

Examples 10 to 14

In the same manner as in Example 1 except for the modification that the film formation step for the second optically anisotropic layer in Example 1 was modified as follows, TN-mode liquid crystal display devices in the individual Examples were prepared. As a coating solution for forming the first optically anisotropic layer, the aforementioned coating solution I-No. 1 for forming the first optically anisotropic layer was used.

(1) Preparation of a Film for use as the Second Optically Anisotropic Layer

Using a band casting machine, a cellulose acylate solution A-1 of the same composition as used in Example 1 and cellulose acylate solutions A-2 to A-5 of the compositions described below in Table 2 were cast in Example 10 and Examples 11 to 14, respectively. At a residual solvent amount of about 60%, the resulting films were peeled off from the bands, transferred with a tenter, for drying at 110° C. for 5 minutes and further at 140° C. for 10 minutes, to obtain cellulose acylate films for use as the second optically anisotropic layer of a film thickness of 80 µm. In a stabilizer C used in Examples 13 and 14, Adekastab PEP-36 (under the trademark name; manufactured by ADEKA) was used as an anti-deterioration agent. The $T_{g0}$ of the film for use as the second optically anisotropic layer in Example 11 using the cellulose acylate solution A-2 was 145° C.; $T_c$ thereof was 157° C.; and $T_m$ thereof was 283° C. The $T_{g0}$ of the film for use as the second optically anisotropic layer in Example 12 using the cellulose acylate solution A-3 was 149° C.; $T_c$ thereof was 158° C.; and $T_m$ thereof was 283° C. The $T_{g0}$ of both of the films for use as the second optically anisotropic layer in Examples 13 and 14 using the cellulose acylate solutions A-4 and A-5, respectively was 138° C.; $T_c$ thereof was 155° C.; and $T_m$ thereof was 282° C.

(2) Drawing Step

Longitudinal uniaxial drawing process with a roll drawer was carried out. The drawing conditions are shown below. As the roll of the roll drawer, an inductive exothermic jacket roll with the surface treated by planishing process was used. The temperature of each roll was adjusted. Drawing ratio was controlled by adjusting the ratio of the peripheral speed of the nip roll downstream and the peripheral speed of the nip roll upstream. The longitudinal/crosswise ratio (the distance between the nip rolls/the width of base inlet) was adjusted to 0.5. The drawing speed was 10%/min of the drawing distance. The drawing ratio was set to 26% while the temperature was set to 200° C.

(3) Heat Treatment Step

Both the ends of the film along the width direction were held with a tenter clip, for thermally treating the cellulose acylate film while avoiding the dimensional change along the width direction by controlling the distance between the clip holding one of the ends and the clip holding the other end. The heating zone was at 200° C., to pass the film through the zone in 10 minutes to obtain the cellulose acylate film.

The resulting cellulose acylate film was with Re(550) of 90 nm and Rth(550) of 60 nm. Additionally, the wavelength dispersion thereof was as follows.

$$Re(450)-Re(550)=-17 \text{ nm}$$

$$Rth(450)-Rth(550)=34 \text{ nm}$$

The thickness of the cellulose acylate film for use as the second optically anisotropic layer as obtained in such manner was 75 µm. Using the cellulose acylate film, a polarizing plate and a TN-mode liquid crystal display device were prepared by the same method as in Example 2.

Comparative Example 1

In the same manner as in Example 1 except for the modification that the film formation step for use as the second optically anisotropic layer and the coating and drying step of the alignment layer in Example 1 were modified as follows, a TN-mode liquid crystal display device was prepared.

(1) Preparation of Cyclic Polyolefin Film Functioning as the Second Optically Anisotropic Layer The following composition was charged in a mixing tank, for agitation to dissolve the individual components; and the resulting mixture was filtered through a filter paper of a mean pore size of 34 µm and through a sintered metal filter of a mean pore size of 10 µm.

Composition of Cyclic Polyolefin Solution A

| | |
|---|---|
| Arton G (manufactured by JSR) | 150 parts by mass |
| Methylene chloride | 550 parts by mass |
| Ethanol | 50 parts by mass |

The following composition containing the cyclic polyolefin solution via ring opening polymerization as prepared by the aforementioned method was charged in a dispersing machine, to prepare a mat agent in dispersion.

Composition of the Mat Agent in Dispersion

| | |
|---|---|
| Silica particle of a mean particle size of 16 nm (Aerosil R972 manufactured by Nippon Aerosil Co., Ltd.) | 2 parts by mass |
| Methylene chloride | 75 parts by mass |
| Ethanol | 5 parts by mass |
| Cyclic polyolefin solution A | 10 parts by mass |

100 parts by mass of the cyclic polyolefin solution A and 1.1 parts by mass of the mat agent in dispersion were mixed together, to prepare a second dope for use as the second optically anisotropic layer, namely "Arton" in Comparative Example 1.

Using A band casting machine, the dope "Arton" was cast. At a residual solvent amount of about 22%, the resulting film was peeled off from the band and drawn with a tenter at a drawing ratio of 50% along the width direction. Subsequently, the drawn film was transferred from the tenter transfer to the roll transfer, dried at 120 to 140° C. and rolled up. The thickness of the cyclic polyolefin film for use as the second optically anisotropic layer was 50 μm, with Re(550) of 80 nm and Rth(550) of 60 nm. The $T_{go}$ of the film was 170° C. The film was treated by glow discharge between upper and lower electrodes made of brass (in argon atmosphere) (at a frequency of 3000 Hz under a high-frequency voltage of 4200 V loaded between the upper and lower electrodes for 20 seconds), to prepare the cyclic polyolefin film via ring opening polymerization.

(2) Coating and Drying of Alignment Layer

One face of the prepared support was treated by a plasma process at atmospheric pressure (electrode manufactured by Sekisui Kagaku Co., Ltd.; conditions: atmospheric oxygen concentration 3% by volume (97% by volume nitrogen); frequency: 30 Hz; film transfer speed: 1 m/min), for hydrophilic treatment of the one face. Via the hydrophilic process, the contact angle of water was reduced from 90° to 28°, indicating that the one face was sufficiently hydrophilized.

Coating a coating solution of the following composition for forming an alignment layer with a wire bar #14 at a wet coat amount of 24 ml/cm² on the treated face, the face was dried at 100° C. for 2 minutes and then heated at 130° C. for 2.5 minutes, to form a cured film. The thickness of the alignment layer was 1.0 μm.

Composition of Coating Solution for Forming Alignment Layer in Comparative Example 1

| | |
|---|---|
| Modified polyvinyl alcohol of the following formula | 40 parts by mass |
| Water | 728 parts by mass |
| Methanol | 228 parts by mass |
| Glutaraldehyde | 2 parts by mass |
| Citric acid | 0.08 part by mass |
| Citrate monoethyl ester | 0.29 part by mass |
| Citrate diethyl ester | 0.27 part by mass |
| Citrate triethyl ester | 0.05 part by mass |

Modified polyvinyl alcohol

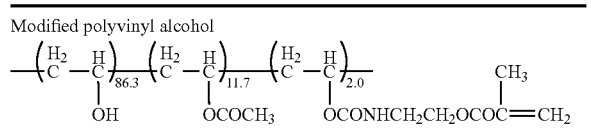

Using the film for use as the second optically anisotropic layer on which the alignment layer was formed, a polarizing plate and a TN-mode liquid crystal display device were prepared by the same method as in Example 1.

Comparative Example 2

In the same manner as in Example 1 except for the modification that the film formation step of the second optically anisotropic layer in Example 1 was modified as follows, a TN-mode liquid crystal display device was prepared.

(1) Preparation of a Film for use as the Second Optically Anisotropic Layer

Using a band casting machine, a cellulose acylate solution B of the following composition was cast. At a residual solvent amount of about 60%, the resulting film was peeled off from the band and was then transferred with a center, for drying at 110° C. for 5 minutes and further at 140° C. for 10 minutes, to obtain a raw roll film for use as the second optically anisotropic layer, which was of a film thickness of 80 μm. The $T_{go}$ of the film was 160° C.; $T_c$ thereof was 172° C.; and $T_m$ thereof was 283° C.

Composition of Cellulose Acylate Solution B

| | |
|---|---|
| Cellulose acetate of a mean substitution degree of 2.94 | 100.0 parts by mass |
| Methylene chloride (first solvent) | 517.6 parts by mass |
| Methanol (second solvent) | 77.3 parts by mass |
| Silica particle of a mean particle size of 16 nm (AEROSIL R972 manufactured by Nippon Aerosil Co., Ltd.) | 0.13 part by mass |
| Controller of optical anisotropy (the compound AA) | 11.7 parts by mass |
| Citrate ester | 0.01 part by mass |

(2) Drawing Step

Longitudinal uniaxial drawing process with a roll drawer was carried out. The drawing conditions are shown below. As the roll of the roll drawer, an inductive exothermic jacket roll with the surface treated by planishing process was used. The temperature of each roll was adjusted. Drawing ratio was controlled by adjusting the ratio of the peripheral speed of the nip roll downstream and the peripheral speed of the nip roll upstream. The longitudinal/crosswise ratio (the distance between the nip rolls/the width of base inlet) was adjusted to 0.5. The drawing speed was 10%/min of the drawing distance. The drawing ratio was set to 13% while the temperature was set to 150° C.

(3) Heat Treatment Step

Both the ends of the film along the width direction were held with a tenter clip, for thermally treating the cellulose acylate film while avoiding the dimensional change along the width direction by controlling the distance between the clip holding one of the ends and the clip holding the other end. The heating zone was at 200° C., to pass the film through the zone in 10 minutes to obtain the cellulose acylate film. The thickness of the resulting cellulose acylate film was 75 μm with Re(550) of 80 nm and Rth(550) of 60 nm. Additionally, the wavelength dispersion thereof was as follows.

$Re(450)-Re(550)=12$ nm $Rth(450)-Rth(550)=-13$ nm

Using the cellulose acylate film, a polarizing plate and a TN-mode liquid crystal display device were prepared by the same method as in Example 1.

Test Example 1

The TN-mode liquid crystal display devices prepared in Examples 1 to 14 and Comparative examples 1 and 2 were evaluated as follows. The results are shown below in Table 2.

(1) Evaluation of Yellowish Tint Along Oblique Lateral Direction

Brightness was equally divided in eight levels from black to white (black display (L1) to white display (L8)), and the sixth brightness level (L6) from black was displayed on the prepared liquid crystal display devices. By defining the normal direction of the display plane as 0° and rotating the measuring position from 0° to 60° along the direction of the display plane, using the upper and lower direction of the display plane as the rotation axis, the color change b* was measured and evaluated on the following standards.

○; b* of 30 or less with no prominent yellowish tint.
X: b* exceeding 30 with prominent yellowish tint.

(2) Viewing Angle Along Upper and Lower Direction or Along Right and Left Direction For black display (L1) and white display (LB8), the contrast viewing angles on the prepared liquid crystal display devices were measured with a meter [EZ-Contrast 160D manufactured by ELDIM Corporation]. The mean value of the contrast ratios (white transmission ratio/black transmission ratio) was determined along the upper and lower direction or along the right and left direction at the polar angle of 80 degrees. Based on the following standards, evaluation was carried out.

◉: 50 or more
○: less than 50 but 40 or more.
Δ: less than 40 but 30 or more.
X: less than 30.

TABLE 2

| | First optically anisotropic layer | | Second optically anisotropic layer Coating solution | | | | | |
|---|---|---|---|---|---|---|---|---|
| | Composition of coating solution | Re (550) (nm) | Composition of coating solution | Short wavelength- adjuster of wavelength dispersion | Amount added (wt %) | Long wavelength- adjuster of wavelength dispersion | Amount added (wt %) | Stabilizer | Amount added (wt %) |
| Example 1 | I-No. 1 | 28 | A-1 | AB | 7.5 | no | 0 | no | 0 |
| Example 2 | I-No. 2 | 28 | A-1 | AB | 7.5 | no | 0 | no | 0 |
| Example 3 | I-No. 3 | 28 | A-1 | AB | 7.5 | no | 0 | no | 0 |
| Example 4 | I-No. 4 | 28 | A-1 | AB | 7.5 | no | 0 | no | 0 |
| Example 5 | I-No. 5 | 28 | A-1 | AB | 7.5 | no | 0 | no | 0 |
| Example 6 | I-No. 6 | 28 | A-1 | AB | 7.5 | no | 0 | no | 0 |
| Example 7 | I-No. 7 | 28 | A-1 | AB | 7.5 | no | 0 | no | 0 |
| Example 8 | I-No. 8 | 28 | A-1 | AB | 7.5 | no | 0 | no | 0 |
| Example 9 | ¶ | 50 | A-1 | AB | 7.5 | no | 0 | no | 0 |
| Example 10 | I-No. 1 | 28 | A-1 | AB | 7.5 | no | 0 | no | 0 |
| Example 11 | I-No. 1 | 28 | A-2 | AC | 4 | no | 0 | no | 0 |
| Example 12 | I-No. 1 | 28 | A-3 | AD | 3 | no | 0 | no | 0 |
| Example 13 | I-No. 1 | 28 | A-4 | AB | 7.5 | no | 0 | C | 0.3 |
| Example 14 | I-No. 1 | 28 | A-5 | AB | 7.5 | AE | 0.5 | C | 0.3 |
| Comparative Example 1 | I-No. 1 | 28 | Arton | no | 0 | no | 0 | no | 0 |
| Comparative Example 2 | I-No. 1 | 26 | B | no | 0 | no | 0 | no | 0 |

| | Second optically anisotropic layer Optical properties | | | | | | TN property | |
|---|---|---|---|---|---|---|---|---|
| | Re (550) (nm) | Rth (550) (nm) | Re(450)-Re (550) (nm) | Rth(450)-Rth (550) (nm) | Re(550)-Re (650) (nm) | Rth(550)-Rth (650) (nm) | Yellowish tint | Viewing angle |
| Example 1 | 80 | 60 | −35 | 44 | 0 | 0 | ○ | ○ |
| Example 2 | 80 | 60 | −35 | 44 | 0 | 0 | ○ | ○ |
| Example 3 | 80 | 60 | −35 | 44 | 0 | 0 | ○ | ○ |
| Example 4 | 80 | 60 | −35 | 44 | 0 | 0 | ○ | ○ |
| Example 5 | 80 | 60 | −35 | 44 | 0 | 0 | ○ | ○ |
| Example 6 | 80 | 60 | −35 | 44 | 0 | 0 | ○ | ○ |
| Example 7 | 80 | 60 | −35 | 44 | 0 | 0 | ○ | ○ |
| Example 8 | 80 | 60 | −35 | 44 | 0 | 0 | ○ | ○ |
| Example 9 | 80 | 60 | −37 | 40 | 0 | 0 | ○ | ○ |
| Example 10 | 90 | 60 | −41 | 44 | 0 | 0 | ○ | ◉ |
| Example 11 | 80 | 60 | −40 | 43 | −1 | 0 | ○ | ○ |
| Example 12 | 80 | 60 | −42 | 45 | −2 | 1 | ○ | ○ |
| Example 13 | 80 | 60 | −35 | 44 | 0 | 0 | ○ | ○ |
| Example 14 | 80 | 60 | −39 | 45 | −15 | 20 | ○ | ◉ |
| Comparative Example 1 | 80 | 60 | −1 | 1 | 0 | 0 | X | ○ |
| Comparative Example 2 | 80 | 60 | 12 | −13 | 7 | −8 | X | ○ |

As apparently shown in the results in Table 2, the yellowish tint along the oblique lateral direction was at an approximately level never visually observable on any of the TN-mode liquid crystal display devices in Examples 1 to 14 satisfying the conditions of the invention. Additionally, the viewing angles of the TN-mode liquid crystal display devices in Examples 1 to 14 were wide. In contrast, the yellowish tint along the oblique lateral direction on any of the TN-mode liquid crystal display devices in Comparative Examples 1 and 2 never satisfying the conditions of the invention was at a level visually observable.

Using the coating solutions I-No. 2 to I-No. 8 for use in the first optically anisotropic layer instead of the coating solution for use in the first optically anisotropic layer in Examples 10 to 14, the individual Examples were practiced. Consequently, the results with similar tendency were obtained.

Examples 101 to 118

Preparation of Liquid Crystal Display Device with Liquid Crystal Cells with Multi-Gap Structures Using the polarizing plates prepared above in Examples 1, 9 and 14 and using liquid crystal cells of multi-gap structures satisfying the condition for the formula (dR−dB) as described below in Table 3, TN-mode liquid crystal display devices in Examples 101 to 118 were prepared.

Specifically, liquid crystal cells of multi-gap structures for TN mode were individually prepared by the following procedures, where the cell gaps corresponding to the individual color filters of red, green and blue satisfied the following conditions.

A liquid crystal cell with a multi-gap structure, where dR=4.2 μm, dG=4.2 μm, dB=4.2 μm, and dR−dB=0.

A liquid crystal cell with a multi-gap structure, where dR=4.6 μm, dG=4.2 μm, dB=3.8 μm, and dR−dB=0.8.

A liquid crystal cell with a multi-gap structure, where dR=5.0 μm, dG=4.2 μm, dB=3.4 μm, and dR−dB=1.6.

A liquid crystal cell with a multi-gap structure, where dR=5.2 μm, dG=4.2 μm, dB=3.2 μm, and dR−dB=2.

A liquid crystal cell with a multi-gap structure, where dR=5.4 μm, dG=4.2 μm, dB=3.0 μm, and dR−dB=2.4.

A liquid crystal cell with a multi-gap structure, where dR=5.8 μm, dG=4.2 μm, dB=2.6 μm, and dR−dB=3.2.

A polyimide film was mounted as an alignment layer on counter glass substrates with ITO electrodes, and the alignment layer was processed with a rubbing treatment.

A liquid crystal compound LC1 of Δn of 0.10 (550 nm, 20° C.) and Δε=about +0.8 was injected in the thickness of a liquid crystal cell to prepare a liquid crystal cell for use in TN mode. Herein, the liquid crystal cell prepared included red pixels, green pixels and blue pixels as the color pixels of plural colors, where the Cell gaps corresponding to the individual color pixels were as described above.

Each sheet of the polarizing plates prepared in Examples 1, 9 and 14 was attached through an adhesive to the viewer side of the liquid cell and to the back light side, so that the first optically anisotropic layer might be arranged on the liquid crystal cells. Then, the transmission axis of the polarizing plate on the side of viewers is allowed to be perpendicular to the transmission axis of the polarizing plate on the side of the back light. In such manner, the TN-mode liquid crystal display devices of the individual Examples were prepared.

Test Example 2

The TN-mode liquid crystal display devices prepared in Examples 101 to 118 were evaluated as follows. The results are shown below in Table 3.

(1) Evaluation of the Change of the Whitish Tint Along Oblique Direction

Brightness was equally divided in eight levels from black to white (black display (L1) to white display (L8)). By defining the normal direction of the display plane as 0° and rotating the measuring position from 0° to 60° along the direction of the display plane, using the upper and lower direction of the display plane as the rotation axis during half tone display, the color tint change Δu'v' between 0° and 60° was measured and evaluated on the following standards.

◎: Δu'v'≦0.01; almost no change of the color visually observable.

○: 0.01<Δu'v'≦0.03; the change of the color slightly observable.

Δ: 0.03<Δu'v'≦0.05; the change of the color visually observable but acceptable.

X: 0.05<Δu'v'; marked change of the color never acceptable.

(2) Evaluation of Yellowish Tint Along the Oblique Lateral Direction

Brightness was equally divided in eight levels from black to white (black display (L1) to while display (L8)), and the sixth brightness level (L6) from black was displayed on the prepared liquid crystal display devices. By defining the normal direction of the display plane as 0° and rotating the measuring position from 0° to 60° along the direction of the display plane, using the upper and lower direction of the display plane as the rotation axis, the color tint change b* was measured and evaluated on the following standards.

◎: b* of 15 or less, with almost no yellowish tint observable.

○: b* exceeding 15 but at 30 or less, with no prominent yellowish tint.

Δ: b* exceeding 30, with prominent yellowish tint.

(3) Viewing Angle Along Upper and Lower Direction and Along Right and Left Direction For black display (L1) and white display (L8), the contrast viewing angles on the prepared liquid crystal display devices were measured with a meter [EZ-Contrast 160D manufactured by ELDIM Corporation]. The mean value of the contrast ratios (white transmission ratio/black transmission ratio) was determined along the upper and lower direction or along the right and left direction at the polar angle of 80 degrees. Based on the following standards, evaluation was carried out.

◎: 50 or more

○: less than 50 but 40 or more.

Δ: less than 40 but 30 or more.

X: less than 30.

TABLE 3

| | First optically anisotropic layer | | Second optically anisotropic layer Coating solution | | | | | |
|---|---|---|---|---|---|---|---|---|
| | Composition of coating solution | Re (550) (nm) | Composition of coating solution | Short wavelength-adjuster of wavelength dispersion | Amount added (wt %) | Long wavelength-adjuster of wavelength dispersion | Amount added (wt %) | Stabilizer | Amount added (wt %) |

| | Composition of coating solution | Re (550) (nm) | Composition of coating solution | Short wl adjuster | Amount (wt %) | Long wl adjuster | Amount (wt %) | Stabilizer | Amount (wt %) |
|---|---|---|---|---|---|---|---|---|---|
| Example 101 | I-No. 1 | 28 | A-1 | Compound AB | 7.5 | no | 0 | no | 0 |
| Example 102 | I-No. 1 | 28 | A-1 | Compound AB | 7.5 | no | 0 | no | 0 |
| Example 103 | I-No. 1 | 28 | A-1 | Compound AB | 7.5 | no | 0 | no | 0 |
| Example 104 | I-No. 1 | 28 | A-1 | Compound AB | 7.5 | no | 0 | no | 0 |
| Example 105 | I-No. 1 | 28 | A-1 | Compound AB | 7.5 | no | 0 | no | 0 |
| Example 106 | I-No. 1 | 28 | A-1 | Compound AB | 7.5 | no | 0 | no | 0 |
| Example 107 | ¶ | 50 | A-1 | Compound AB | 7.5 | no | 0 | no | 0 |
| Example 108 | ¶ | 50 | A-1 | Compound AB | 7.5 | no | 0 | no | 0 |
| Example 109 | ¶ | 50 | A-1 | Compound AB | 7.5 | no | 0 | no | 0 |
| Example 110 | ¶ | 50 | A-1 | Compound AB | 7.5 | no | 0 | no | 0 |
| Example 111 | ¶ | 50 | A-1 | Compound AB | 7.5 | no | 0 | no | 0 |
| Example 112 | ¶ | 50 | A-1 | Compound AB | 7.5 | no | 0 | no | 0 |
| Example 113 | I-No. 1 | 28 | A-5 | Compound AB | 7.5 | AB | 0.5 | C | 0.3 |
| Example 114 | I-No. 1 | 28 | A-5 | Compound AB | 7.5 | AB | 0.5 | C | 0.3 |
| Example 115 | I-No. 1 | 28 | A-5 | Compound AB | 7.5 | AB | 0.5 | C | 0.3 |
| Example 116 | I-No. 1 | 28 | A-5 | Compound AB | 7.5 | AB | 0.5 | C | 0.3 |
| Example 117 | I-No. 1 | 28 | A-5 | Compound AB | 7.5 | AB | 0.5 | C | 0.3 |
| Example 118 | I-No. 1 | 28 | A-5 | Compound AB | 7.5 | AB | 0.5 | C | 0.3 |

| | Second optically anisotropic layer Optical properties | | | | | | HG | TN property | | |
|---|---|---|---|---|---|---|---|---|---|---|
| | Re (550) (nm) | Rth (550) (nm) | Re (450)-Re (550) (nm) | Rth (450)-Rth (550) (nm) | Re (550)-Re (650) (nm) | Rth (550)-Rth (650) (nm) | liquid crystal cell (dR-dB) (µm) | Whitening | Yellowish tint | Viewing angle |
| Example 101 | 80 | 60 | −35 | 44 | 0 | 0 | 0 | Δ | ○ | ○ |
| Example 102 | 80 | 60 | −35 | 44 | 0 | 0 | 0.0 | Δ | ◎ | ○ |
| Example 103 | 80 | 60 | −35 | 44 | 0 | 0 | 1.6 | ○ | ◎ | ○ |
| Example 104 | 80 | 60 | −35 | 44 | 0 | 0 | 2 | ○ | ◎ | ○ |
| Example 105 | 80 | 60 | −35 | 44 | 0 | 0 | 2.4 | ○ | ◎ | ○ |
| Example 106 | 80 | 60 | −35 | 44 | 0 | 0 | 3.2 | ◎ | ○ | Δ |
| Example 107 | 80 | 60 | −37 | 40 | 0 | 0 | 0 | Δ | ○ | ○ |
| Example 108 | 80 | 60 | −37 | 40 | 0 | 0 | 0.8 | Δ | ◎ | ○ |
| Example 109 | 80 | 60 | −37 | 40 | 0 | 0 | 1.6 | ○ | ◎ | ○ |
| Example 110 | 80 | 60 | −37 | 40 | 0 | 0 | 2 | ○ | ◎ | ○ |
| Example 111 | 80 | 60 | −37 | 40 | 0 | 0 | 2.4 | ○ | ◎ | ○ |
| Example 112 | 80 | 60 | −37 | 40 | 0 | 0 | 3.2 | ◎ | ○ | Δ |
| Example 113 | 80 | 60 | −39 | 45 | −15 | 20 | 0 | Δ | ○ | ◎ |
| Example 114 | 80 | 60 | −39 | 45 | −15 | 20 | 0.8 | Δ | ◎ | ◎ |
| Example 115 | 80 | 60 | −39 | 45 | −15 | 20 | 1.6 | ○ | ◎ | ◎ |
| Example 116 | 80 | 60 | −39 | 45 | −15 | 20 | 2 | ○ | ◎ | ◎ |
| Example 117 | 80 | 60 | −39 | 45 | −15 | 20 | 2.4 | ○ | ◎ | ◎ |
| Example 118 | 80 | 60 | −39 | 45 | −15 | 20 | 3.2 | ◎ | ○ | ○ |

Table 3 indicates chat the liquid crystal display devices resulting from combinations of the optical compensatory film of the invention with the liquid crystal cells with such multi-gap structures got more improved changes of whitish tint and yellowish tint.

Within the ranges of the gap values, the change of whitish tint was better as MG was larger. However, the preferable range thereof was 0 to 3.0 µm from the standpoint of the consistency with the yellowish tint.

Using the coating solutions I-No. 2 to I-No. 8 for use in the first optically anisotropic layer in combination with the liquid crystal cells of the multi-gap structures described in Table 3, instead of the coating solution for use in the first optically anisotropic layer in Examples 101 to 106, TN-mode liquid crystal display devices were prepared. The same evaluation results of the changes of whitish tint and yellowish tint and the viewing angle as in Examples 101 to 106 and Examples 113 to 118 were obtained.

The present disclosure relates to the subject matter contained in Japanese Patent Application No. 178431/2008 filed on Jul. 8, 2008; Japanese Patent Application No. 253759/2008 filed on Sep. 30, 2008; and Japanese Patent Application No. 81545/2009 filed on Mar. 30, 2009, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An optical compensatory film of a laminated structure comprising:
    a first optically anisotropic layer having an Re(550) of 20 to 100 nm wherein retardation at a wavelength of 550 nm is never 0 nm along any direction and the direction along which the absolute value of retardation at a wavelength of 550 nm reaches minimum does not exist along the normal direction of the layer or on the in-plane of the layer; and
    a second optically anisotropic layer having an Re(550) of 20 to 150 nm and an Rth(550) of 40 to 110 nm with the following inequality formulae (a) and (b) being satisfied:

$$Re(450)-Re(550)<-3 \text{ nm} \qquad (a)$$

$$Rth(450)-Rth(550)>3 \text{ nm} \qquad (b)$$

wherein Re(450) represents an in-plane retardation at a wavelength of 450 nm; Re(550) represents an in-plane retardation at a wavelength of 550 nm; Rth(450) represents a retardation along the thickness direction at a wavelength of 450 nm; and Rth(550) represents a retardation along the thickness direction at a wavelength of 550 nm.

2. The optical compensatory film according to claim 1, wherein the first optically anisotropic layer comprises a liquid crystal compound.

3. The optical compensatory film according to claim 1, wherein the first optically anisotropic layer comprises a discotic liquid crystal compound.

4. The optical compensatory film according to claim 3, wherein the discotic liquid crystal compound is fixed at a hybrid aligned state in the first optically anisotropic layer.

5. The optical compensatory film according to claim 1, wherein the second optically anisotropic layer comprises a compound having a negative intrinsic birefringence and a compound having an absorption peak within the range of 250 to 400 nm.

6. The optical compensatory film according to claim 5, wherein the second optically anisotropic layer comprises the compound having an absorption peak within the range of 250 to 400 nm in an amount of 2 to 20% by mass relative to 100% by mass of the compound having a negative intrinsic birefringence.

7. The optical compensatory film according to claim 5, wherein the compound having a negative intrinsic birefringence is a cellulose acylate having a total substitution degree of 2.7 to 3.0.

8. The optical compensatory film according to claim 1, wherein the second optically anisotropic layer comprises a compound having a negative intrinsic birefringence and a compound having an absorption peak within the range of 700 to 1200 nm.

9. The optical compensatory film according to claim 8, wherein the second optically anisotropic layer comprises the compound having an absorption peak within the range of 700 to 1200 nm in an amount of 0.001 to 2% by mass relative to 100% by mass of the compound having a negative intrinsic birefringence.

10. The optical compensatory film according to claim 1, wherein the second optically anisotropic layer satisfies the following inequality formulae (C) and (d):

$$Re(550)-Re(650)<-3 \text{ nm} \qquad (c)$$

$$Rth(550)-Rth(650)>3 \text{ nm} \qquad (d)$$

wherein Re(550) represents an in-plane retardation at a wavelength of 550 nm; Re(650) represents an in-plane retardation at a wavelength of 650 nm; Rth(550) represents a retardation along the thickness direction at a wavelength of 550 nm; and Rth(650) represents a retardation along the thickness direction at a wavelength of 650 nm.

11. The optical compensatory film according to claim 1, comprising an alignment layer between the first optically anisotropic layer and the second optically anisotropic layer.

12. A method for producing an optical compensatory film of a laminated structure comprising a first optically anisotropic layer and a second optically anisotropic layer, comprising laminating:
    a first optically anisotropic layer having an Re(550) of 20 to 100 nm wherein retardation at a wavelength of 550 nm is never 0 nm along any direction and the direction along which the absolute value of retardation at a wavelength of 550 nm reaches minimum does not exist along the normal direction of the layer or on the in-plane of the layer; and
    a second optically anisotropic layer having an Re(550) of 20 to 150 nm and an Rth(550) of 40 to 110 nm with the following inequality formulae (a) and (b) being satisfied:

$$Re(450)-Re(550)<-3 \text{ nm} \qquad (a)$$

$$Rth(450)-Rth(550)>3 \text{ nm} \qquad (b)$$

wherein Re(450) represents an in-plane retardation at a wavelength of 450 nm; Re(550) represents an in-plane retardation at a wavelength of 550 nm; Rth(450) represents a retardation along the thickness direction at a wavelength of 450 nm; and Rth(550) represents a retardation along the thickness direction at a wavelength of 550 nm.

13. The method for producing an optical compensatory film according to claim 12, comprising:
    producing a preliminary film for the second optically anisotropic layer; and
    drawing the preliminary film along the transfer direction of the preliminary film during the transfer thereof to form the second optically anisotropic layer.

14. The method for producing an optical compensatory film according to claim 12, comprising:
    producing a preliminary film for the second optically anisotropic layer; and
    subjecting the preliminary film to a heat treatment at a temperature of $T_{g0}$ to $T_{m0}$ to form the second optically anisotropic layer wherein $T_{g0}$ represents the glass transition temperature of the preliminary film before the heat treatment and $T_{m0}$ represents the melting point of the preliminary film before the heat treatment.

15. The method for producing an optical compensatory film according to claim 12, comprising:
    producing the second optically anisotropic layer by using a composition containing a compound having a negative intrinsic birefringence and a compound having a absorption peak of 250 to 400 nm.

16. The method for producing an optical compensatory film according to claim 12, comprising:
    producing the second optically anisotropic layer by using a composition containing a compound having a negative intrinsic birefringence and a compound having an absorption peak of 700 to 1200 nm.

17. A TN-mode liquid crystal display device comprising an optical compensatory film wherein:
- the optical compensatory film has a laminated structure comprising a first optically anisotropic layer and a second optically anisotropic layer,
- the first optically anisotropic layer has an Re(550) of 20 to 100 nm wherein retardation at a wavelength of 550 nm is never 0 nm along any direction and the direction along which the absolute value of retardation at a wavelength of 550 nm reaches minimum does not exist along the normal direction of the layer or on the in-plane of the layer; and
- the second optically anisotropic layer has an Re(550) of 20 to 150 nm and an Rth(550) of 40 to 110 nm with the following inequality formulae (a) and (b) being satisfied:

$$Re(450)-Re(550)<-3 \text{ nm} \tag{a}$$

$$Rth(450)-Rth(550)>3 \text{ nm} \tag{b}$$

wherein Re(450) represents an in-plane retardation at a wavelength of 450 nm; Re(550) represents an in-plane retardation at a wavelength of 550 nm; Rth(450) represents a retardation along the thickness direction at a wavelength of 450 nm; and Rth(550) represents a retardation along the thickness direction at a wavelength of 550 nm.

18. The TN-mode liquid crystal display device according to claim 17, equipped with a liquid crystal cell and a polarizing plate mounted on at least one side of the liquid crystal cell, wherein:
- the liquid crystal cell comprises red, green and blue color filters and liquid crystal layers individually corresponding to the red, green and blue color filters,
- the liquid crystal layers have multi-gap structures satisfying the relation represented by the following inequality formula:

$$dR \geq dG > dB, \text{ or}$$

$$dR > dG \geq dB$$

wherein dR, dG and dB each represent the thickness values of the liquid crystal layers corresponding to the red, green and blue color filters, respectively, and
- the polarizing plate comprises a polarizing film and the optically compensation film as mounted on the liquid crystal cell side of the polarizing film.

19. The TN-mode liquid crystal display device according to claim 18, wherein the multi-gap structures of the liquid crystal layers satisfy the following inequality formula:

$$0 \text{ μm} < dR-dB \leq 3.0 \text{ μm}.$$

* * * * *